(12) United States Patent
Yang et al.

(10) Patent No.: US 11,374,686 B2
(45) Date of Patent: Jun. 28, 2022

(54) PARITY CHECK BITS FOR NON-COHERENT COMMUNICATION

(71) Applicant: QUALCOMM Incorporated, San Diego, CA (US)

(72) Inventors: Wei Yang, San Diego, CA (US); Yi Huang, San Diego, CA (US); Hung Dinh Ly, San Diego, CA (US); Gokul Sridharan, Sunnyvale, CA (US); Hwan Joon Kwon, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/166,993

(22) Filed: Feb. 3, 2021

(65) Prior Publication Data
US 2021/0242967 A1    Aug. 5, 2021

Related U.S. Application Data

(60) Provisional application No. 62/970,131, filed on Feb. 4, 2020.

(51) Int. Cl.
*H04L 1/00* (2006.01)
*H04B 7/0413* (2017.01)

(52) U.S. Cl.
CPC ......... *H04L 1/0063* (2013.01); *H04B 7/0413* (2013.01)

(58) Field of Classification Search
CPC ... H04L 1/00–0091; H04J 13/00–0077; H04B 7/04–0495
See application file for complete search history.

(56) References Cited

U.S. PATENT DOCUMENTS

| 11,005,597 B2 * | 5/2021 | Xi ........................ H04L 1/0072 |
| 11,075,786 B1 * | 7/2021 | Shattil .................. H04L 12/413 |

(Continued)

FOREIGN PATENT DOCUMENTS

| EP | 1198100 A2 | 4/2002 | |
| EP | 3306844 A1 * | 4/2018 | .......... H03M 13/258 |

(Continued)

OTHER PUBLICATIONS

International Search Report and Written Opinion—PCT/US2021/016602—ISA/EPO—dated Apr. 28, 2021.

(Continued)

*Primary Examiner* — Chi H Pham
*Assistant Examiner* — Vladislav Y Agureyev
(74) *Attorney, Agent, or Firm* — Seyfarth Shaw LLP

(57) ABSTRACT

A method of wireless communication at a transmitting device includes adding parity check bits to a set of information bits. The method also includes generating a non-coherent transmission signal by mapping the parity check bits and the set of information bits into a sequence of complex symbols. Further, the method may include transmitting the non-coherent transmission signal to a receiving device. A method of wireless communication at a receiving device includes receiving, from a transmitting device, a non-coherent signal having at least one segment. Each segment comprises a sequence of complex symbols corresponding to information bits and parity check bits. The method also includes jointly detecting the sequences from each segment of the received non-coherent signal by using the parity check bits.

30 Claims, 19 Drawing Sheets

(56) References Cited

U.S. PATENT DOCUMENTS

| | | | |
|---|---|---|---|
| 11,245,493 B2* | 2/2022 | Smith | H04L 1/0059 |
| 2005/0185722 A1* | 8/2005 | Abe | H04L 1/0078 |
| | | | 375/259 |
| 2008/0260073 A1* | 10/2008 | Jin | H03M 13/253 |
| | | | 375/340 |
| 2009/0177941 A1* | 7/2009 | Wager | H04L 1/0061 |
| | | | 714/752 |
| 2010/0185926 A1* | 7/2010 | Lawson | H04L 1/0061 |
| | | | 714/E11.032 |
| 2010/0199157 A1* | 8/2010 | Takaoka | H04L 1/1819 |
| | | | 714/E11.032 |
| 2011/0138259 A1* | 6/2011 | Tan | H04B 1/0039 |
| | | | 714/795 |
| 2012/0099660 A1* | 4/2012 | Mun | H04L 25/0212 |
| | | | 375/E7.2 |
| 2012/0148260 A1* | 6/2012 | Akiyama | H04B 10/588 |
| | | | 398/183 |
| 2012/0290893 A1* | 11/2012 | Hauske | H04L 1/0045 |
| | | | 714/800 |
| 2015/0033098 A1* | 1/2015 | Chui | H03M 13/37 |
| | | | 714/776 |
| 2015/0237602 A1* | 8/2015 | Chae | H04B 7/08 |
| | | | 370/329 |
| 2016/0043745 A1* | 2/2016 | Vojcic | H04L 25/0236 |
| | | | 714/755 |
| 2016/0248555 A1* | 8/2016 | Lei | H04W 16/14 |
| 2016/0308687 A1* | 10/2016 | Nickel | H04L 12/40169 |
| 2017/0164240 A1* | 6/2017 | Liang | H04W 28/22 |
| 2017/0237528 A1* | 8/2017 | Wu | H04L 1/1845 |
| | | | 370/329 |
| 2017/0366299 A1* | 12/2017 | Li | H04L 1/0061 |
| 2018/0034589 A1* | 2/2018 | Sun | H04L 1/0061 |
| 2018/0048426 A1* | 2/2018 | Yang | H04L 1/0059 |
| 2018/0159707 A1* | 6/2018 | Onggosanusi | H04L 27/2601 |
| 2018/0191539 A1* | 7/2018 | Haran | H04L 1/00 |
| 2018/0323906 A1* | 11/2018 | Nammi | H04L 1/08 |
| 2018/0331699 A1* | 11/2018 | Lin | H04L 5/0016 |
| 2019/0052415 A1* | 2/2019 | Nammi | H04L 1/0057 |
| 2019/0158219 A1* | 5/2019 | Blankenship | H04L 1/0041 |
| 2019/0173499 A1* | 6/2019 | Zheng | H04L 1/0057 |
| 2019/0190654 A1* | 6/2019 | You | H04L 5/0007 |
| 2019/0312676 A1* | 10/2019 | Jeong | H03M 13/6356 |
| 2019/0312678 A1* | 10/2019 | Yokomakura | H04L 1/0063 |
| 2019/0318247 A1* | 10/2019 | Yao | C12N 15/00 |
| 2019/0361774 A1* | 11/2019 | Pawlowski | G06F 3/0673 |
| 2020/0036477 A1* | 1/2020 | Xu | H03M 13/09 |
| 2020/0044776 A1* | 2/2020 | Guan | H04W 72/042 |
| 2020/0099393 A1* | 3/2020 | Xu | H03M 13/09 |
| 2020/0099471 A1* | 3/2020 | Ye | H03M 13/6362 |
| 2020/0145139 A1* | 5/2020 | Merlin | H04L 1/1812 |
| 2020/0228236 A1* | 7/2020 | Xi | H04L 1/0072 |
| 2020/0252158 A1* | 8/2020 | Shen | H04L 1/0072 |
| 2020/0260449 A1* | 8/2020 | Suzuki | H04L 5/0007 |
| 2020/0358555 A1* | 11/2020 | Chen | H04L 1/0042 |
| 2021/0090688 A1* | 3/2021 | Yao | G06N 3/123 |
| 2021/0092732 A1* | 3/2021 | Lee | H04W 72/0486 |
| 2021/0152282 A1* | 5/2021 | Huang | H04L 1/0631 |
| 2021/0152289 A1* | 5/2021 | Lee | H04L 1/0067 |
| 2021/0160732 A1* | 5/2021 | Lee | H04L 5/0055 |
| 2021/0176004 A1* | 6/2021 | Jeong | H03M 13/6552 |
| 2021/0242966 A1* | 8/2021 | Gao | H04L 1/0061 |
| 2021/0242967 A1* | 8/2021 | Yang | H04J 13/0077 |
| 2022/0007400 A1* | 1/2022 | Zhang | H04L 1/1614 |

FOREIGN PATENT DOCUMENTS

| | | | | |
|---|---|---|---|---|
| WO | WO-2018030205 A1 * | 2/2018 | | H04L 1/0048 |
| WO | WO-2018119153 A2 * | 6/2018 | | H01Q 1/2283 |
| WO | WO-2018141212 A1 * | 8/2018 | | H03M 13/09 |
| WO | WO-2018167980 A1 * | 9/2018 | | |
| WO | WO-2019063534 A1 * | 4/2019 | | H04B 7/0482 |

OTHER PUBLICATIONS

Skander C-D., et al., "Rate-Adaptive Transmission of H.263 Video for Multicode DS/CDMA Cellular Systems in Multipath Fading", VTC Spring 2002, IEEE 55th, Vehicular Technology Conference, Proceedings, Birmingham, AL, May 6-9, 2002, [IEEE Vehicular Technolgy Conference], New York, NY, IEEE, US, vol. 1, May 6, 2002 (May 6, 2002), XP001210431, pp. 473-477, DOI:10.1109/VTC.2082.1082768 ISBN: 978-0-7803-7484-3.

Mohammadi A.H.S., et al., "Combined Turbo-Code and Modulation for CDMA Wireless Communications", VTC'98. 48th, IEEE Vehicular Technology Conference, Ottawa, Canada, May 18-21, 1998, [IEEE Vehicular Technology Conference], New York, NY, IEEE, vol. Conf. 48, May 18, 1998 (May 18, 1998), XP000903354, pp. 1920-1924, ISBN 978-0-7803-4321-4.

Samsung: "On Short PUCCH with 1 Symbol", 3GPP Draft, 3GPP TSG RAN WG1 Meeting #88bis, R1-1705388 On Short PUCCH with 1 Symbol-Samsung, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017 Apr. 2, 2017 (Apr. 2, 2017), XP051243518, pp. 1-9, Retrieved from the Internet: URL:http://www.3gpp.org/ftp/Meetings_3GPP_SYNC/RAN1/Docs/[retrieved on Apr. 2, 2017].

* cited by examiner

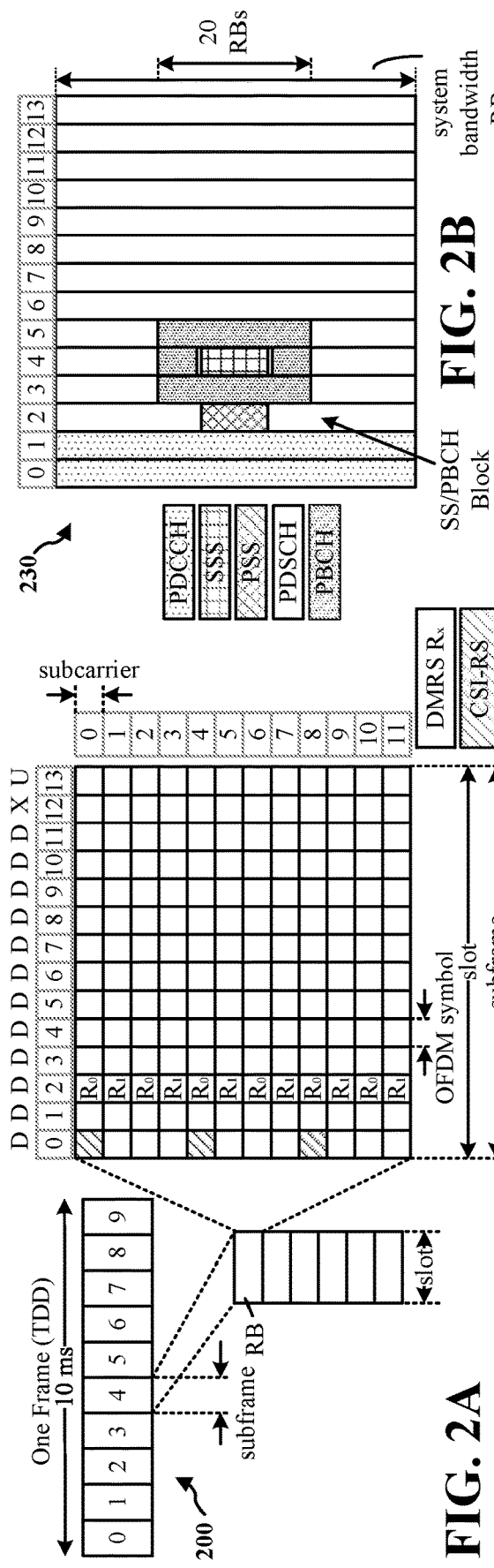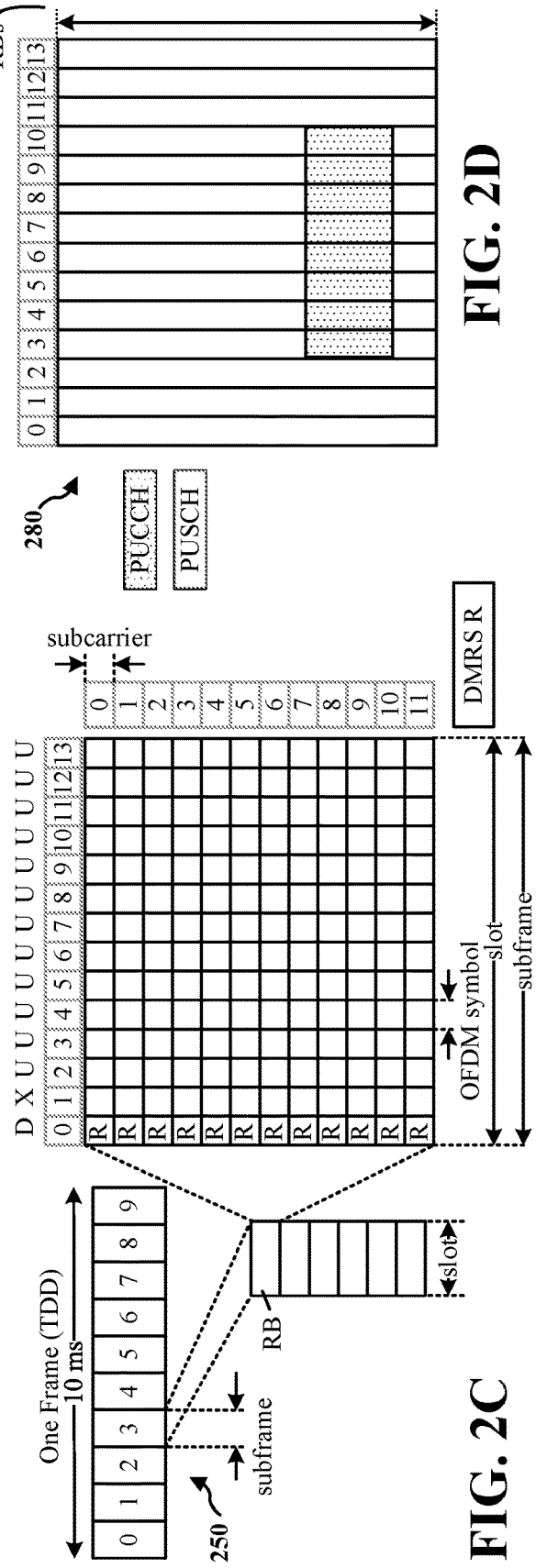

US 11,374,686 B2

PARITY CHECK BITS FOR NON-COHERENT COMMUNICATION

CROSS-REFERENCE TO RELATED APPLICATION

The present application claims the benefit of U.S. Provisional Patent Application No. 62/970,131, filed on Feb. 4, 2020, and entitled "PARITY CHECK BITS FOR NON-COHERENT COMMUNICATION," the disclosure of which is expressly incorporated by reference in its entirety.

BACKGROUND

Technical Field

The present disclosure relates generally to communication systems, and more particularly, to non-coherent wireless communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of the present disclosure, a method of wireless communication at a transmitting device may include adding parity check bits to a set of information bits. The method may also include generating a non-coherent transmission signal by mapping the parity check bits and the set of information bits into a sequence of complex symbols. Further, the method may include transmitting the non-coherent transmission signal to a receiving device.

In some aspects, a method of wireless communication at a receiving device includes receiving, from a transmitting device, a non-coherent signal having at least one segment. Each segment includes a sequence of complex symbols corresponding to information bits and parity check bits. The method may also include jointly detecting the sequences from each segment of the received non-coherent signal by using the parity check bits.

A transmitting device for wireless communication may include a memory and one or more processors operatively coupled to the memory. The memory and the one or more processors may add parity check bits to a set of information bits. The transmitting device may also generate a non-coherent transmission signal by mapping the parity check bits and the set of information bits into a sequence of complex symbols. The transmitting device may also transmit the non-coherent transmission signal to a receiving device.

A receiving device for wireless communication may include a memory and one or more processors operatively coupled to the memory. The memory and the one or more processors may receive, from a transmitting device, a non-coherent signal having at least one segment. Each segment includes a sequence of complex symbols corresponding to information bits and parity check bits. The receiving device may also include jointly detecting the sequences from each segment of the received non-coherent signal by using the parity check bits.

A transmitting device for wireless communication may include means for adding parity check bits to a set of information bits. The transmitting device may also include means for generating a non-coherent transmission signal by mapping the parity check bits and the set of information bits into a sequence of complex symbols. The transmitting device may also include means for transmitting the non-coherent transmission signal to a receiving device.

A receiving device for wireless communication may include means for receiving, from a transmitting device, a non-coherent signal having at least one segment. Each segment may include a sequence of complex symbols corresponding to information bits and parity check bits. The receiving device may also include means for jointly detecting the sequences from each segment of the received non-coherent signal by using the parity check bits.

A non-transitory computer-readable medium may include program code executed by a transmitting device. The medium may include program code to add parity check bits to a set of information bits. The medium may also include program code to generate a non-coherent transmission signal by mapping the parity check bits and the set of information bits into a sequence of complex symbols. The medium may also include program code to transmit the non-coherent transmission signal to a receiving device.

A non-transitory computer-readable medium may include program code executed by a receiving device. The medium may include program code to receive, from a transmitting device, a non-coherent signal having at least one segment. Each segment may also include a sequence of complex symbols corresponding to information bits and parity check bits. The medium may also include program code to jointly detect the sequences from each segment of the received non-coherent signal by using the parity check bits.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
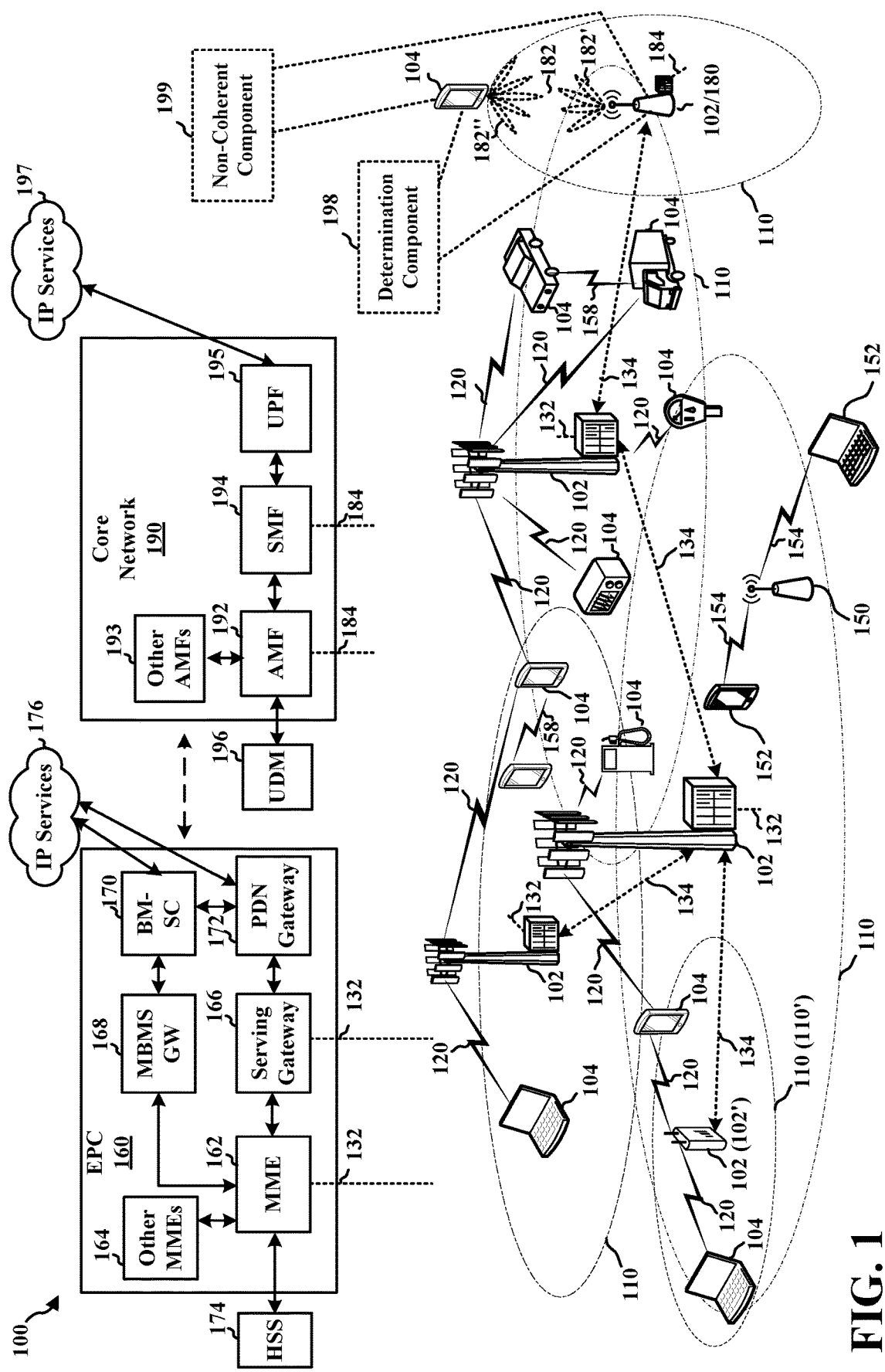
FIG. 1 is a diagram illustrating an example of a wireless communications system and an access network.

Coherent communication systems may not perform well with signals having a low signal-to-noise ratio (SNR). For example, at low SNR, a receiver increases an amount of energy allocated for pilot signals (e.g., a demodulation reference signal (DMRS)) transmissions to improve channel estimates. The pilot signal does not convey any useful information, such that the energy expended to transmit the pilot signal does not send any useful information. In addition, the quality of channel estimates may be poor at low SNR. If the receiver is unable to estimate the channel accurately, then the demodulation and decoding will suffer, which may lead to performance loss.

A UE at a cell edge may be operating at low SNR. The coherent communication scheme utilizing the pilot may not work effectively for such cell edge UEs. In order to overcome the issue or improve the performance, for example at low SNR, the present disclosure provides a non-coherent communication system.

In a coherent communication system, the receiver performs the demodulation and decoding in a coherent manner, where the receiver estimates the channel of the received signal based on the pilot. In a non-coherent communication system, the transmitter does not transmit any pilot, such as a DMRS, but instead will transmit the information directly to the receiver. The receiver then determines or decodes the information received from the transmitter without performing any channel estimation. Although the receiver does not perform any channel estimation explicitly, after the receiver demodulates or decodes the information, a channel estimate may be a by-product of the receiving algorithm. In other words, after the receiver decodes and demodulates the signal, the receiver may obtain an estimate of channel coefficients.

According to aspects of the present disclosure, parity check bits are inserted into an information payload prior to partitioning the information payload into groups and mapping the groups to sequences for transmitting to a receiver. The parity bits enable the receiver to jointly detect the groups of the information payload. The parity bits may be cyclic redundancy check (CRC) bits. In another option, the parity bits may be CRC bits plus additional parity check bits. The receiver may determine a list of candidates for each group in the received signal. The receiver selects a candidate for each group that satisfies the parity checks.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit and reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARM) acknowledgement/negative acknowledgment (ACK/NACK) feedback. The PUSCH carries data, and may additionally be used to carry a buffer status report (BSR), a power headroom report (PHR), and/or UCI.

Figure 3:
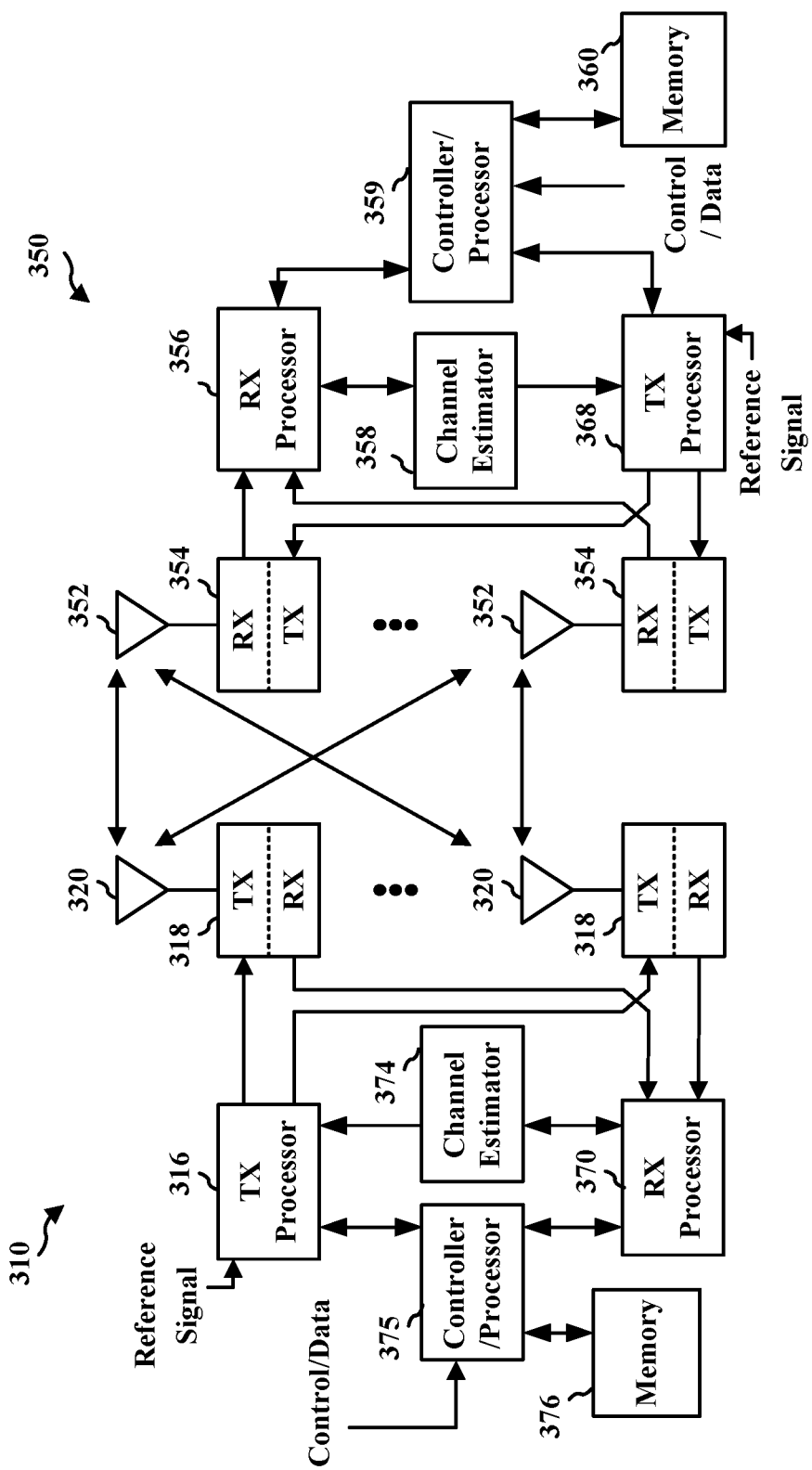
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the determination component 198 or non-coherent component 199 of FIG. 1.

At least one of the TX processor 316, the RX processor 370, and the controller/processor 375 may be configured to perform aspects in connection with the determination component 198 or non-coherent component 199 of FIG. 1.

Figure 4:
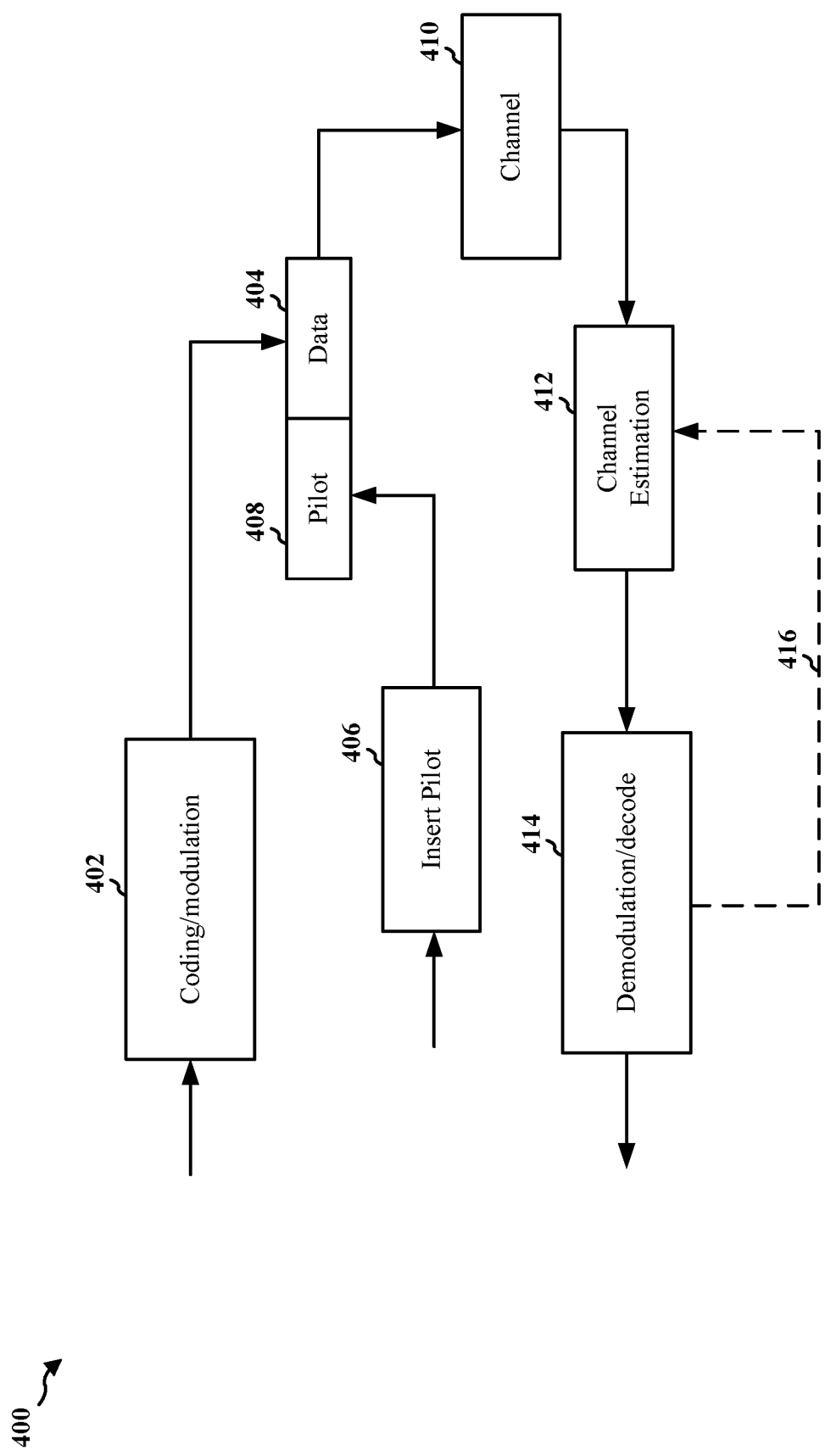
FIG. 4 is a diagram illustrating an example of a coherent communication system.

FIG. 4 is a diagram 400 illustrating an example of a coherent communication system. In wireless systems based on coherent communication, a transmitter generates a signal by coding and modulating 402 the signal and transmits data 404 and pilot symbols 408 or a demodulation reference signal (DMRS) along with data. The pilot symbols 408 may be inserted with the data 404 by an insert pilot 406. The data 404 carries the information that the transmitter wants to send to the receiver. The pilot symbols or DMRS 408 does not transmit information, rather, the pilot symbols or DMRS 408 may be used by the receiver to perform channel estimation. The receiver uses the pilot symbols or DMRS 408 to estimate the channel 410 and then sends the channel estimation information 412 to the demodulator/decoder 414 in order to perform coherent demodulation and coherent decoding.

Coherent communication systems may not perform optimally at low signal-to-noise ratio (SNR). For example, at low SNR, in order for the receiver to estimate the channel properly, a large amount of energy is used to transmit the pilot symbols or DMRS. Because the pilot/DMRS does not convey any useful information, the energy consumed to transmit the pilot does not contribute to any useful information. This may result in a loss of energy per bit. In addition, the quality of channel estimation may be poor at low SNR. If the receiver is unable to estimate the channel accurately, then the demodulation and decoding will suffer, which may lead to a dramatic performance loss.

A UE at a cell edge may be operating at low SNR, and the coherent communication scheme utilizing the pilot/DMRS may not work effectively for such cell edge UEs. In order to overcome the issue and to improve the performance, for example at low SNR, the present disclosure provides a non-coherent communication system.

In a coherent communication system, the receiver may be configured to perform the demodulation and decoding in a coherent manner, where the receiver estimates the channel of the received signal based on the pilot/DMRS. In a non-coherent communication system, the transmitter does not transmit any pilot/DMRS, but instead will transmit the information directly to the receiver.

Figure 5:
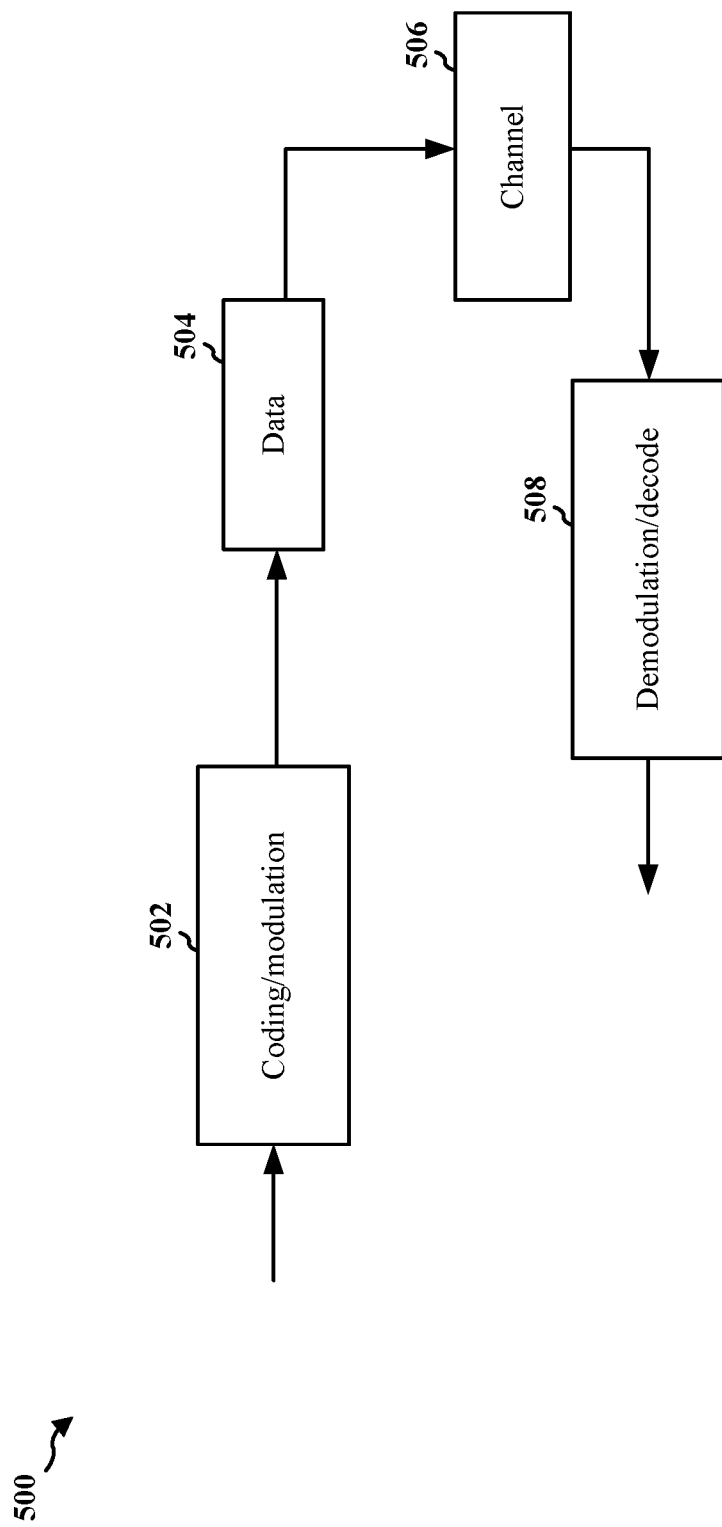
FIG. 5 is a diagram illustrating an example of a non-coherent communication system, in accordance with certain aspects of the disclosure.

FIG. 5 is a diagram 500 illustrating an example of a non-coherent communication system. The transmitter will generate a non-coherent transmission signal by performing the coding/modulation 502 and then transmit the data 504 to the receiver. The receiver then determines or decodes the information received from the transmitter at demodulation/decode 508 without performing a channel estimation procedure. Although the receiver does not explicitly perform a channel estimation, after the receiver demodulates or decodes 508, the information the channel estimate may be determined by channel 506 as a by-product of the receiving algorithm. In other words, after the receiver decodes and demodulates the signal, the receiver may obtain the estimate of the channel coefficient.

Figure 6:
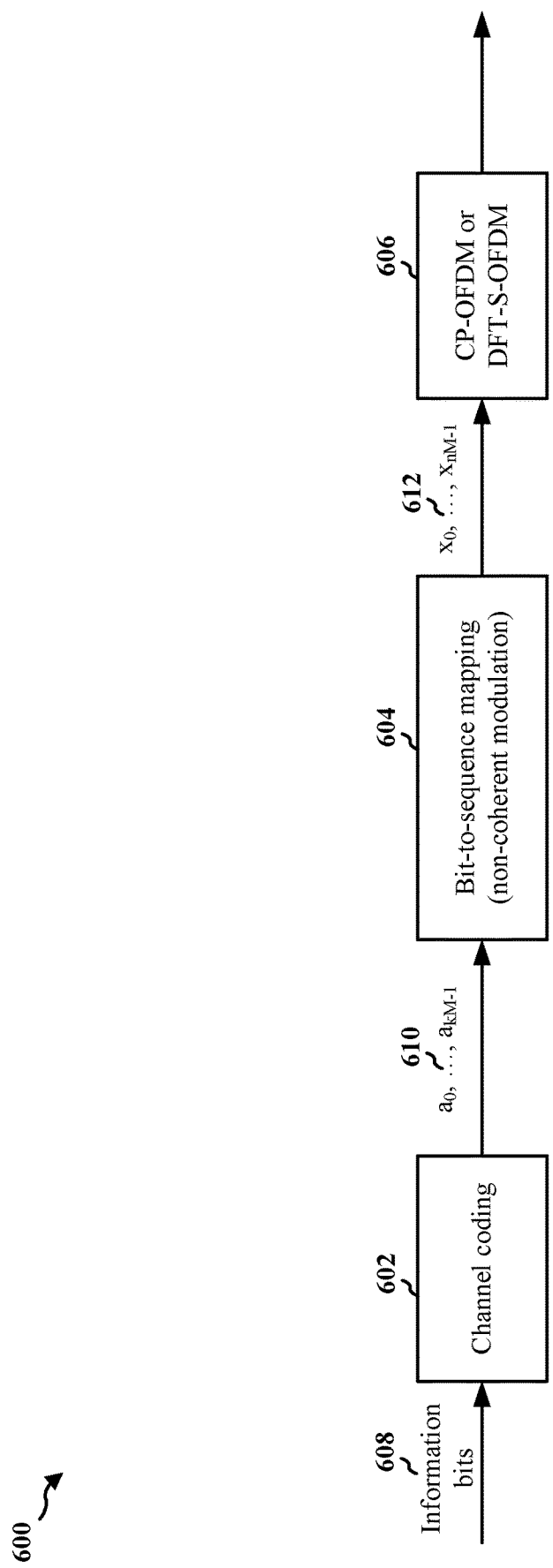
FIG. 6 is a diagram illustrating an example of a transmitter architecture for a non-coherent communication system, in accordance with certain aspects of the disclosure.

FIG. 6 is a diagram 600 illustrating an example of a transmitter architecture for a non-coherent communication system. The diagram 600 of the transmitter architecture includes channel coding 602, bit-to-sequence mapping 604, and CP-OFDM or DFT-S-OFDM 606 waveform generation. On the transmitter side, the transmitter first encodes the information bits 608 at the channel coding block 602, into a coded bit stream 610. The channel coding block 602 may include adding an error detection code (e.g., a cyclic redundancy check (CRC)), channel coding using low density parity check (LDPC) code, Polar code, or other block codes, such as but not limited to Reed-Muller code or the like, interleaving, and/or rate matching. The adding of the error detection, channel coding, interleaving and/or rate matching may be collectively referred to as the channel coding block 602, which may be configured to convert uncoded information bits into coded bits prior to modulation as channel coding. In some aspects, the channel coding block 602 may not be utilized if the payload size (e.g., the number of information bits) is very small (e.g., 20 bits, 40 bits, 48 bits, or the like). In such aspects, the transmitting device may be configured to directly map the information bits into sequences. The transmitter may also be configured to concatenate and/or super-position the sequences to generate the non-coherent signal (e.g., as discussed below). In the aspect disclosed, the listing of very small payload sizes is provided as an example, and the disclosure is not intended to be limited to such examples of payload sizes. Other payload sizes greater than or less than the provided examples may allow for the channel coding block 602 not being utilized, such that the transmitting device may directly map the information bits into sequences.

The transmitter then maps a subset of the sequence of bits into sequences 612 at the bit-to-sequence mapping block 604. The non-coherent sequence mapping may map each subset of k coded bits into a sequence of n complex symbols. For example, if the number of coded bits is kM, then the transmitter may partition the coded bits into M groups with k bits in each group. The transmitter may then map each group of k bits into a sequence of length n. In some aspects, the sequences may be selected from a set C of sequences of cardinality $2^k$. The transmitter may then concatenate the sequences 612 together to form a transmit signal of length nM, which is distinct in view of conventional modulation (e.g., as used in LTE or NR) in which each tuple of coded bits may be mapped to a single complex symbol (e.g., 2 bits in QPSK, 4 bits in 16 QAM, 6 bits in 64 QAM, etc.). For example, FIG. 6, a set of k bits $a_0, \ldots, a_{k-1}$, after channel coding are mapped to bits $x_0, \ldots x_{n-1}$ of a sequence of length n. Another set of k bits $a_k \ldots, a_{2k-1}$, after channel coding are mapped to $x_n, \ldots x_{2n-1}$. Then, the sequences are concatenated to form a concatenated sequence $x_0, \ldots x_{nM-1}$.

In some aspects, the bit-to-sequence mapping 604 may be configured to map groups into two sequences based on a comparison between the groups. For example, in instances where two k-bits groups differ in fewer bits, then the bit-to-sequence mapping 604 may map the two k-bits into two sequences with larger cross-correlation, e.g., (0, 0, 0, 0) in comparison with (0, 0, 0, 1). In instances where two k-bits groups differ in more bits, then the bit-to-sequence mapping 604 may map the two k-bit groups into two sequences with smaller cross-correlation, e.g., (0, 0, 0, 0) in comparison with (1, 1, 1, 1).

The channel coding block 602 may be configured to contain all the coding-related procedures, such as but not limited to, CRC insertion, channel coding, rate-matching, interleaving, and/or scrambling.

Figure 7A:
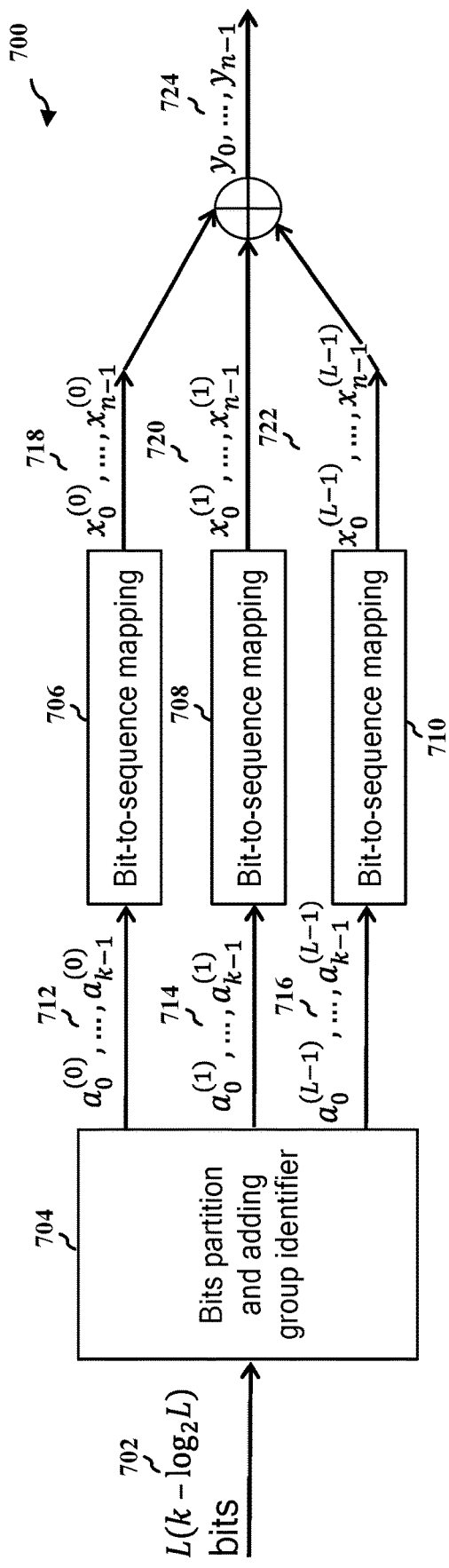
FIG. 7A is a diagram illustrating another example of the transmitter architecture for a non-coherent communication system, in accordance with certain aspects of the disclosure.

FIG. 7A is a diagram 700 illustrating an example of a transmitter architecture for a non-coherent communication system. In some aspects, in order to support a larger payload size, the transmitting device may be configured to superposition multiple sequences together. For example, the transmitting device takes as input the L(k–log$_2$ L) bits, where L is a positive integer (e.g., a power of 2), and divides or partitions the bits, at block 704, into L groups where each group is comprised of k–log$_2$ L L bits. In some aspects, the bits of the L groups may be comprised of coded bits or uncoded bits (e.g., informational or information bits). The transmitting device, in some aspects, for a group of i∈{0, . . . , L–1}, may add a group identifier to each group of bits to form L bit strings of length k. For example, the transmitting device may add a prefix or suffix, at block 704, of log$_2$ L bits to the group of bits to form a k bit string $a^{(i)}$ (e.g., 712, 714, 716). The transmitting device may be configured to add the group identifier to the group of bits and is not intended to be limited to the aspects disclosed. The transmitting device may map (e.g., at 706, 708, 710) each bit string $a^{(i)}$ (e.g., 712, 714, 716) to a length-n sequence $x^{(i)}$ (e.g., 718, 720, 722). The transmitting device may then super-position the L sequences to generate one length-n sequence $y_l$ 724, based as follows:

$$y_l = \sum_{i \in (0,...,L-1)} x_l^{(i)}, l = 0, \ldots, n-1$$

Figure 7B:
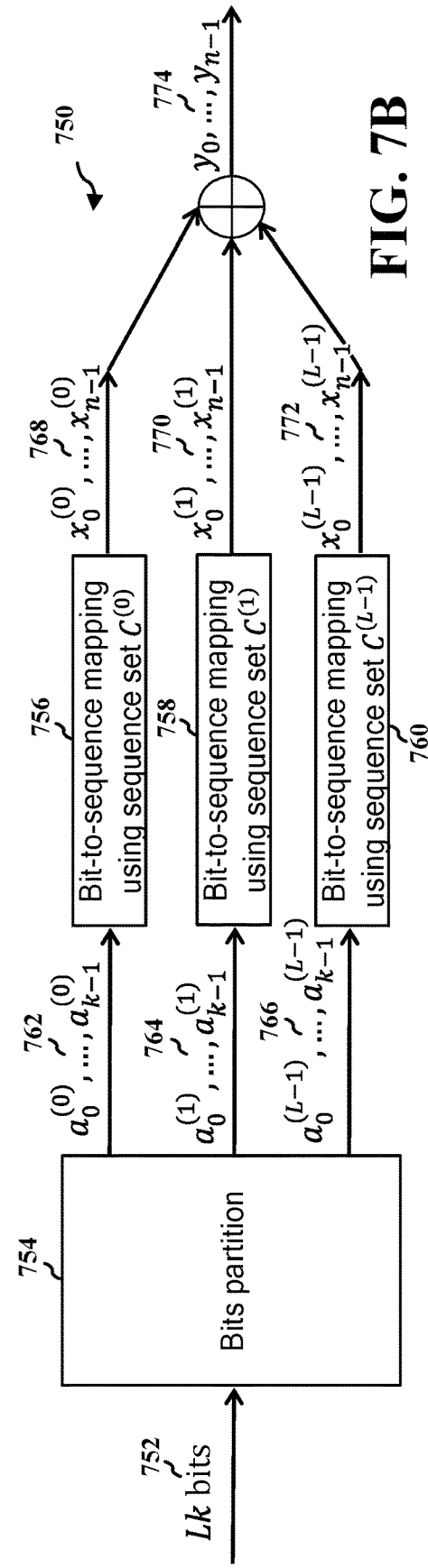
FIG. 7B is a diagram illustrating another example of the transmitter architecture for a non-coherent communication system, in accordance with certain aspects of the disclosure.

FIG. 7B is a diagram 750 illustrating another example of a transmitter architecture for a non-coherent communication system. In some aspects, the transmitter device may be configured to map the different groups of bits into sequences using different sets of sequences. For example, block 754 may receive Lk bits 752 and divide or partition the bits to form the k bit string $a^{(i)}$ (e.g., 762, 764, 766). However, block 754 does not add a group identifier to each group of bits, as discussed above in the example of FIG. 7A. Instead, the transmitting device may be configured to map the different groups of bits into sequences using different sets of sequences, respectively (e.g., at 756, 758, 760). The transmitting device may map (e.g., at 756, 758, 760) each bit string $a^{(i)}$ (e.g., 762, 764, 766) to a length-n sequence $x^{(i)}$ (e.g., 768, 770, 772). For example, a first group of bits $a_0^{(0)}, \ldots, a_{k-1}^{(0)}$ may be mapped to $x_0^{(0)}, \ldots, x_{n-1}^{(0)}$ using sequences from sequence set $C^{(0)}$. A second group of bits $a_0^{(2)}, \ldots, a_{k-1}^{(2)}$ may be mapped to $x_0^{(2)}, \ldots, x_{n-1}^{(2)}$ using sequences from sequence set $C^{(2)}$. An Lth group of bits $a_0^{(L-1)}, \ldots, a_{k-1}^{(L-1)}$ may be mapped to $x_0^{(L-1)}, \ldots, x_{n-1}^{(L-1)}$ using sequences from sequence set $C^{(L-1)}$. In such aspects, the group identifier may be implicitly conveyed through the sequence set. The transmitting device may then super-position the L sequences to generate one length-n sequence $y_l$ 774 in a manner similar to the sequence $y_l$ 724, discussed above.

Figure 8:
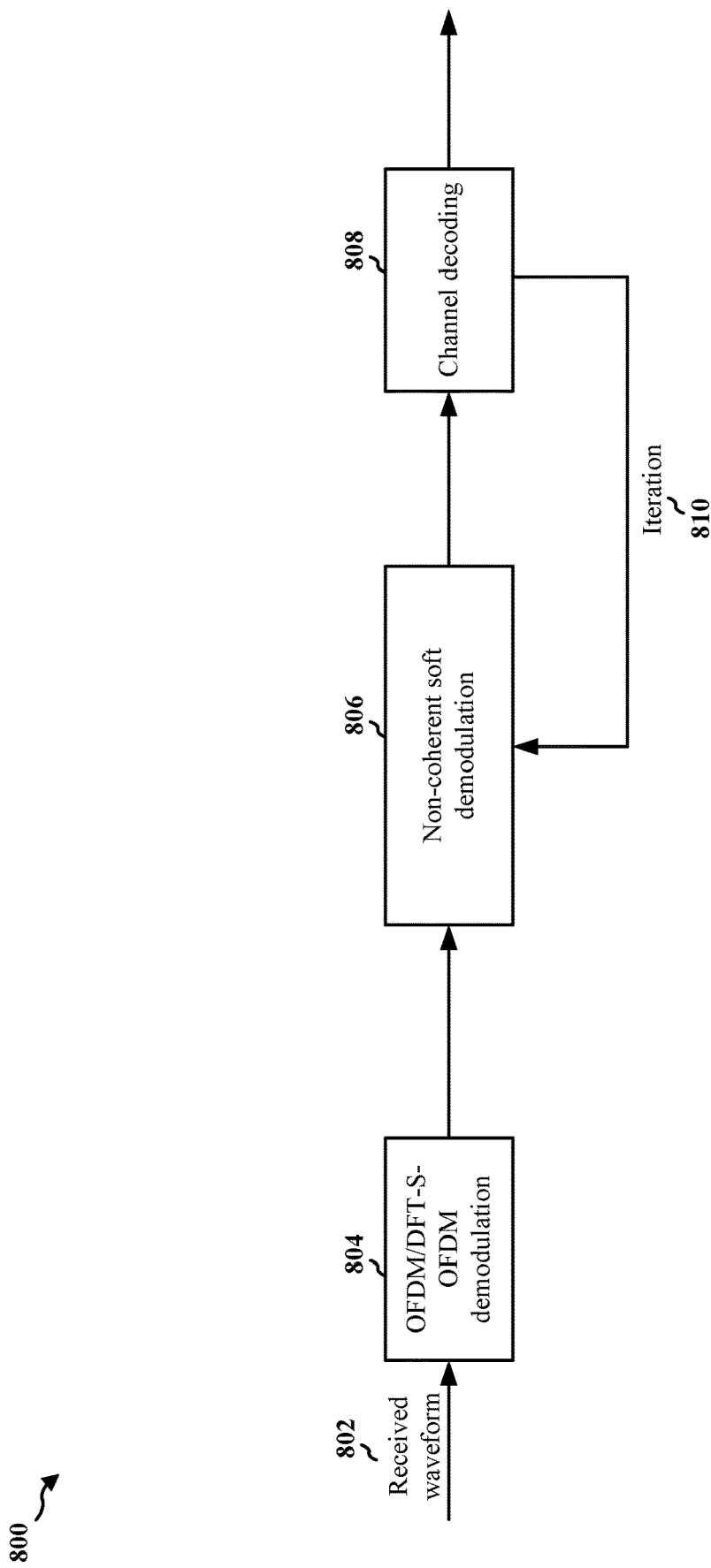
FIG. 8 is a diagram illustrating an example of a receiver architecture for a non-coherent communication system, in accordance with certain aspects of the disclosure.

FIG. 8 is a diagram 800 illustrating an example of a receiver architecture for a non-coherent communication system. The diagram 800 of the receiver architecture includes an OFDM/DFT-S-OFDM demodulation block 804, a non-coherent soft demodulation block 806, and a channel decoding block 808. For each signal $y \in C^n$ received on each receive antenna, the receiving device may first partition the received signals into M sub-groups of length n. Each group of received signals may correspond to one sequence. In some aspects, each group of received signals may correspond to L super-positioned sequences. In some aspects, for example when super-positioning does not occur, the receiver may determine a score $s_j$ for each candidate sequence in the set C of $2^k$ sequences. The score $s_j$ for a candidate sequence $c_j$ may be based on a cross-correlation between the received signal y and the candidate sequence $c_j$. The receiving device, using the scores $s_j$, may determine a log-likelihood ratio (LLR) for each of the k bits. In some aspects, the receiving device may compute the LLR of a particular bit as follows:

$$LLR(a_i) = 2^{1-k}(\Sigma_{j: the\ i\ th\ bit\ of\ c_j\ is\ 0} s_j - \Sigma_{j: the\ i\ th\ bit\ of\ c_j\ is\ 1} s_j)$$

The j: the i-th bit of $c_j$ is 0 refers to the sum over all sequences with the index j, where the i-th bit of the sequence cj is equal to 0. For example, in an aspect where k=3 and i=0, then the sequences corresponding to the following bits are such that the i-th bit is zero, as shown below.

| |
|---|
| 000 |
| 001 |
| 010 |
| 011 |

In another example, where k=3 and i=1, then the sequences that correspond to the following bit strings have the i-th bit equal to 1, as shown below.

| |
|---|
| 100 |
| 101 |
| 110 |
| 111 |

Therefore, in this example, the LLR may be based on a difference between a sum of scores for a particular bit to have a value of 0 and the sum of scores for the particular bit to have a value or 1.

In some aspects, the receiving device may compute the LLR of a particular bit as follows:

$$LLR(a_i) = \max\{s_j : j:\ the\ i\ th\ bit\ of\ c_j\ is\ 0\} - \max\{s_j : j:\ the\ i\ th\ bit\ of\ c_j\ is\ 1\}$$

where max{$s_j$:j: the i th bit of $c_j$ is 0} represents where the score values $s_1$ of the i-th bit of $c_j$ is equal to 0, and then compute the maximum of all of the score values to determine the first term in the equation, and where max{$s_j$:j: the i th bit of $c_j$ is 1} represents where the score values $s_j$ of the i-th bit of $c_j$ is equal to 1, and then compute the minimum of all of the score values to determine the second term in the equation.

Therefore, in this example, the LLR may be based on a difference between a maximum score for a particular bit to have a value of 0 and a maximum score for the particular bit to have a value of 1.

Figure 9:
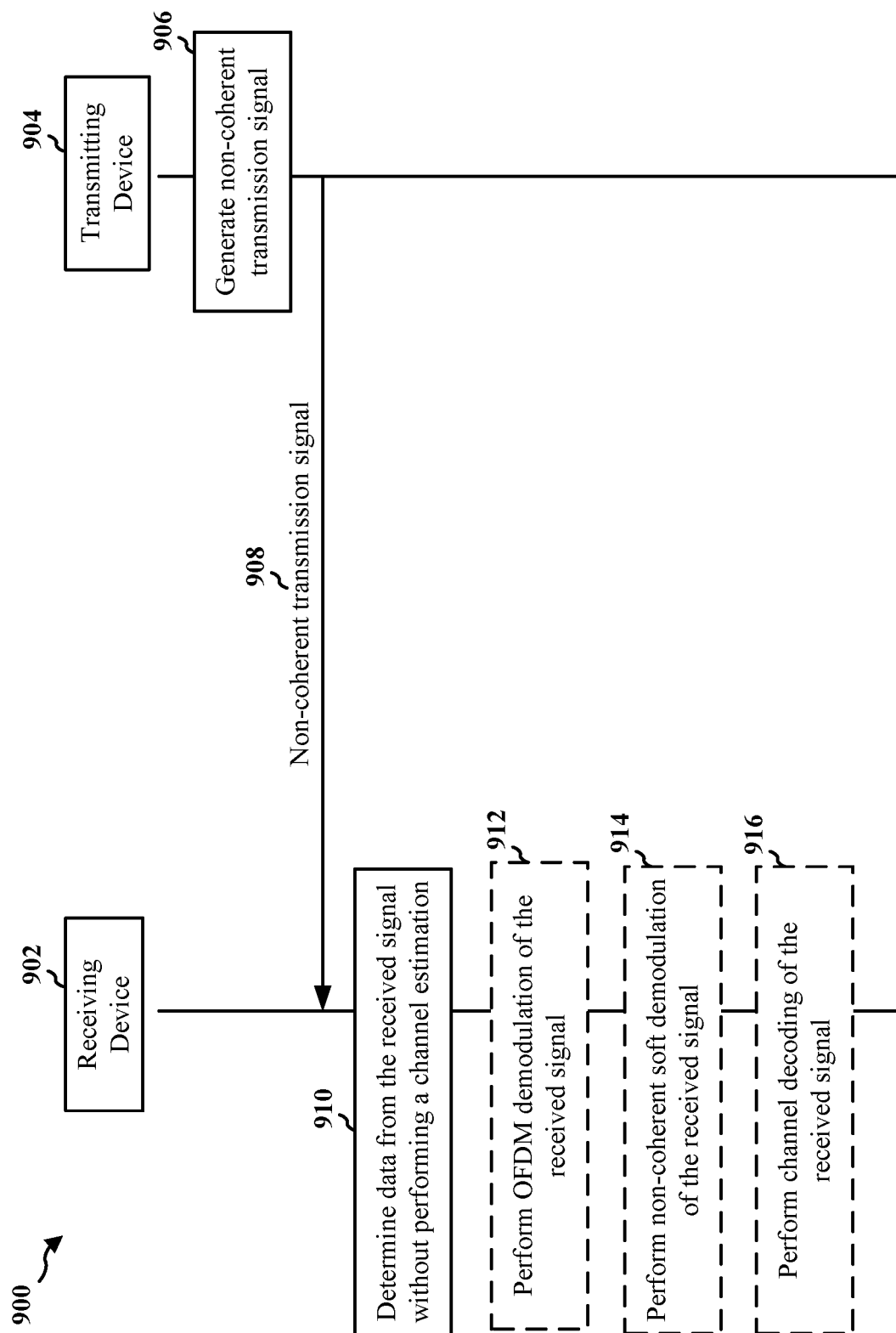
FIG. 9 is a call flow diagram of signaling between a receiving device and a transmitting device, in accordance with certain aspects of the disclosure.

FIG. 9 illustrates an example communication flow 900 between a receiving device 902 and a transmitting device 904. The receiving device 902 may correspond to a UE, and the transmitting device 904 may correspond to a base station. For example, in the context of FIG. 1, the transmitting device 904 may correspond to base station 102/180 and, accordingly, the cell may include a geographic coverage area 110 in which communication coverage is provided and/or small cell 102' having a coverage area 110'. Further, the receiving device 902 may correspond to at least UE 104. In another example, in the context of FIG. 3, the transmitting device 904 may correspond to the base station 310 and the receiving device 902 may correspond to the UE 350. In yet other aspects, the receiving device 902 may correspond to a base station that the transmitting device 904 may correspond to a UE.

At block 906, the transmitting device 904 may generate a non-coherent transmission signal including mapping a subset of bits into a sequence of complex symbols. In some aspects, the subset of bits may comprise a subset of coded bits. The coded bits may be generated from a LDPC code or a Polar code. In some aspects, to generate the non-coherent transmission signal, the transmitting device 904 may map one or more subset of coded bits into a respective sequence of complex symbols. Each group may be mapped into a respective sequence of a length n of multiple sequences. The multiple sequences may be concatenated to form the non-coherent transmission signal. In some aspects, if two k bits group differ in fewer bits, then the two k bit groups may be mapped into two sequences having a larger cross-correlation. In some aspects, if two k bits group differ in more bits, then the two k bit groups may be mapped into two sequences having a smaller cross-correlation.

In some aspects, to generate the non-coherent transmission signal, the transmitting device 904 may add identification information to each of M groups of bits to form M bit strings. The subset of bits may be partitioned into groups. In some aspects, to add identification information, the transmitting device 904 may reserve one or more of the k bits to include the identification information. In some aspects, to add identification information, the transmitting device 904 may add a prefix or suffix comprising the identification information to each of the M groups of bits to form the M bit strings. In some aspects, to generate the non-coherent transmission signal, the transmitting device 904 may map each of the M bit strings to the respective sequence of the length n. In some aspects, to generate the non-coherent transmission signal, the transmitting device 904 may super-position each of the respective sequences of the length n to generate a super-positioned sequence of length n. The identification information may indicate an identity of each of the groups from the M groups involved in the super-position of the sequences.

Upon generating the non-coherent transmission signal, the transmitting device 904 may transmit the non-coherent transmission signal 908 to a receiving device 902. The receiving device 902 receives, from the transmitting device 904, the non-coherent transmission signal 908 having data.

At block 910, the receiving device 902 may determine data from the received signal 908 without performing a channel estimation.

In some aspects, for example at block 912, the receiving device 902 may perform an OFDM demodulation of the received signal. The receiving device 902 may perform the OFDM demodulation to determine the data from the received signal. In some aspects, the receiving device 902 may perform the OFDM demodulation prior to performing the non-coherent soft demodulation.

In some aspects, for example at block 914, the receiving device 902 may perform a non-coherent soft demodulation of the received signal. The receiving device 902 may perform the non-coherent soft demodulation in order to determine the data from the received signal. In some aspects, the receiving device 902 may determine a log-likelihood ratio (LLR) for each bit of the received signal. In some aspects, to perform the non-coherent soft demodulation, the receiving device 902 may partition the received signal into M subgroups of length n. Each group of the received signal may correspond to a candidate sequence. The receiving device 902 may determine a score $s_j$ for each candidate sequence, when performing the non-coherent soft demodulation. In some aspects, the LLR for a bit may be based on a first sum of scores for the bit being based on a first value minus a second sum for the bit being a second value. In some aspects, the LLR for a bit may be based on a first maximum score for the bit being based on a first value minus a second maximum score for the bit being a second value. In some aspects, the score may be based on a cross-correlation between the received signal and the candidate sequence.

In some aspects, for example at block 916, the receiving device 902 may perform a channel decoding of the received signal. The receiving device 902 may perform the channel decoding to determine the data from the received signal. In some aspects, the receiving device 902 may perform the channel decoding after performing the non-coherent soft demodulation of the received signal. In some aspects, an output of the channel decoding may be submitted back to the non-coherent soft demodulation to perform an iterative demodulation and decoding procedure, as described in 808 of FIG. 8.

Figure 10:
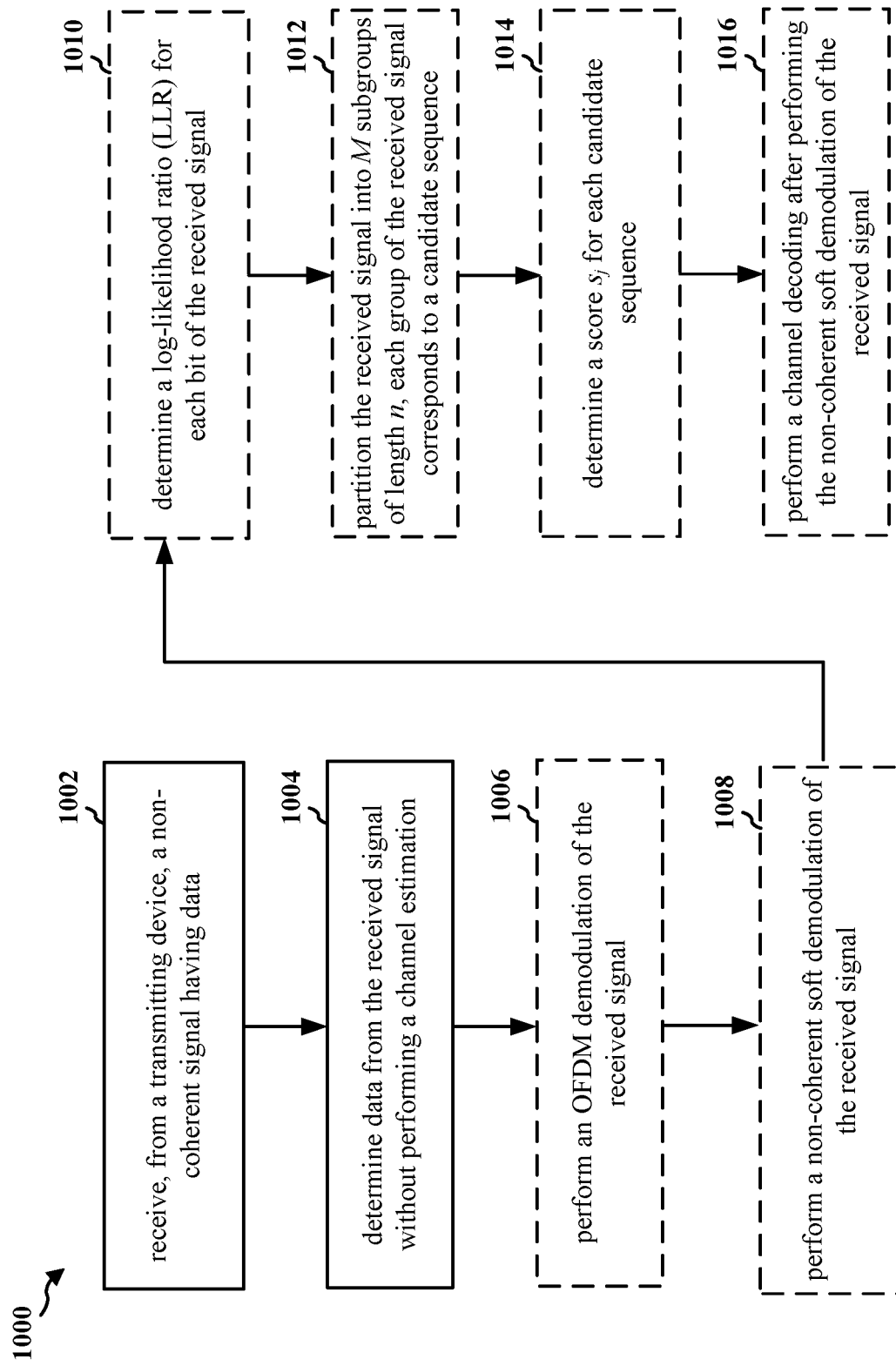
FIG. 10 is a flowchart of a method of wireless communication.

FIG. 10 is a flowchart of a method 1000 of wireless communication. The method may be performed by a receiving device (e.g., the receiving device 902; the apparatus 1102/1102'; the processing system 1214). The method may be performed by a transmitting device (e.g., the transmitting device 904; the apparatus 1402/1402'; the processing system 1514). In some aspects, the receiving device may comprise a UE or a component of the UE, such that the method may be performed by the UE or the component of a UE (e.g., the UE 104, 350; the apparatus 1102/1102'; the processing system 1214, which may include the memory 360 and which may be the entire UE 350 or a component of the UE 350, such as the TX processor 368, the RX processor 356, and/or the controller/processor 359). In some aspects, the receiving device may comprise a base station or a component of the base station, such that the method may be performed by the base station or a component of the base station (e.g., the base station 102, 180, 310; the apparatus 1402/1402'; the processing system 1214, which may include the memory 376 and which may be the entire base station 310 or a component of the base station 310, such as the TX processor 316, the RX processor 370, and/or the controller/processor 375). According to various aspects, one or more of the illustrated operations of method 1000 may be omitted, transposed, and/or contemporaneously performed. Optional aspects are illustrated with a dashed line. The method may allow a receiving device (e.g., UE or base station) to operate in a non-coherent communication scheme and determine the information from a received signal without performing channel estimation.

At block 1002, the receiving device may receive a non-coherent signal having data. For example, block 1002 may be performed by non-coherent component 1106 of apparatus 1102. The receiving device may receive the non-coherent signal from a transmitting device. In some aspects, the receiving device may be a UE and the transmitting device may be a base station. In some aspects, the receiving device may be a base station and the transmitting device may be a UE.

At block 1004, the receiving device may determine data from the received signal without performing a channel estimation. For example, block 1004 may be performed by determination component 1108 of apparatus 1102.

In some aspects, for example at block 1006, the receiving device may performing an OFDM demodulation of the received signal. For example, block 1006 may be performed by OFDM demodulation component 1110 of apparatus 1102.

The receiving device may perform the OFDM demodulation of the received signal to determine the data from the received signal. In some aspects, the receiving device may perform the OFDM demodulation of the received signal prior to performing the non-coherent soft demodulation.

In some aspects, for example at block 1008, the receiving device may perform a non-coherent soft demodulation of the received signal. For example, block 1008 may be performed by soft demodulation component 1112 of apparatus 1102. The receiving device may perform the non-coherent soft demodulation of the received signal to determine the data from the received signal.

In some aspects, for example at block 1010, the receiving device may determine a LLR for each bit of the received signal. For example, block 1010 may be performed by LLR component 1114 of apparatus 1102. The receiving device may determine the LLR for each bit of the received signal to perform the non-coherent soft demodulation of the received signal.

In some aspects, for example at block 1012, to perform the non-coherent soft demodulation, the receiving device may partition the received signal into M subgroups of length n. For example, block 1012 may be performed by partition component 1116 of apparatus 1102. In some aspects, each group of the received signal may correspond to a candidate sequence.

In some aspects, for example at block 1014, to perform the non-coherent soft demodulation, the receiving device may determine a score $s_j$ for each candidate sequence. For example, block 1014 may be performed by score component 1118 of apparatus 1102. In some aspects, the LLR for a bit may be based on a first sum of scores for the bit being a first value minus a second sum for the bit being a second value. In some aspects, the LLR for a bit may be based on a first maximum score for the bit being a first value minus a second maximum score for the bit being a second value. In some aspects, the score may be based on a cross-correlation between the received signal and the candidate sequence.

In some aspects, for example at block 1016, the receiving device may perform a channel decoding of the received signal. For example, block 1016 may be performed by channel decoding component 1120 of apparatus 1102. In some aspects, the receiving device may perform the channel decoding after performing the non-coherent soft demodulation of the received signal. In some aspects, an output of the channel decoding may be submitted back to the non-coherent soft demodulation in order to perform an iterative demodulation and decoding procedure.

Figure 11:
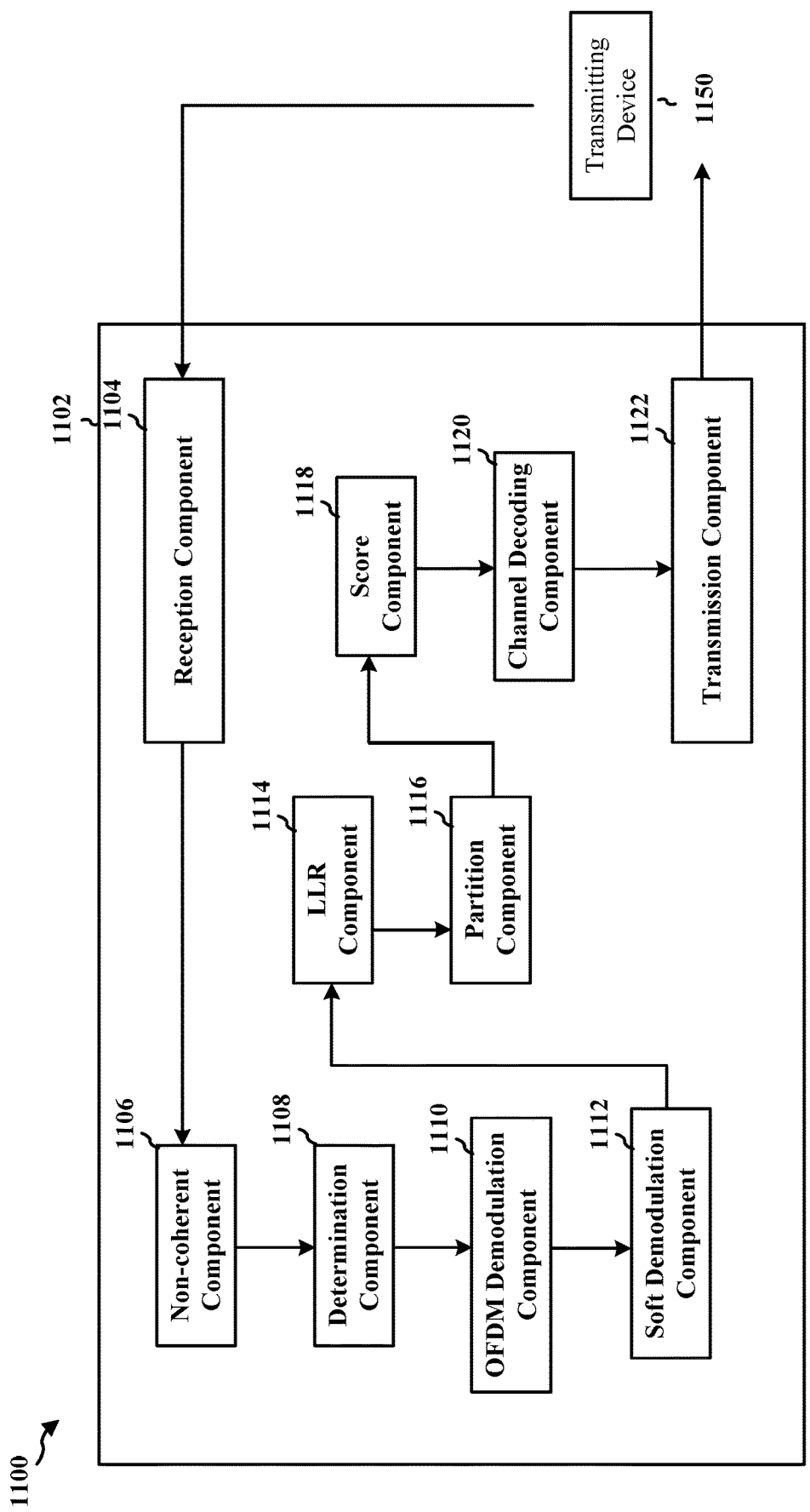
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a receiving device. In some aspects, the apparatus may comprise UE or a component of the UE. In some aspects, the apparatus may comprise a base station or a component of a base station. The apparatus includes a reception component 1104 that may be configured to receive various types of signals/messages and/or other information from other device, including, for example, the transmitting device 1150. The apparatus includes a non-coherent component 1106 that may receive a non-coherent signal having data, e.g., as described in connection with 1002 of FIG. 10. The apparatus includes a determination component 1108 that may determine data from the received signal without performing a channel estimation, e.g., as described in connection with 1004 of FIG. 10. The apparatus includes a soft demodulation component 1110 that may perform a non-coherent soft demodulation of the received signal, e.g., as described in connection with 1006 of FIG. 10. The apparatus includes an OFDM demodulation component 1112 that may perform an OFDM demodulation of the received signal, e.g., as described in connection with 1008 of FIG. 10. The apparatus includes an LLR component 1114 that may determine a LLR for each bit of the received signal, e.g., as described in connection with 1010 of FIG. 10. The apparatus includes a partition component 1116 that may partition the received signal into M subgroups of length n, e.g., as described in connection with 1012 of FIG. 10. The apparatus includes a score component 1118 that may determine a score $s_j$ for each candidate sequence, e.g., as described in connection with 1014 of FIG. 10. The apparatus includes a channel decoding component 1120 that may perform a channel decoding of the received signal, e.g., as described in connection with 1016 of FIG. 10. The apparatus includes a transmission component 1122 that may be configured to transmit various types of signals/messages and/or other information to other devices, including, for example, the transmitting device 1150.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
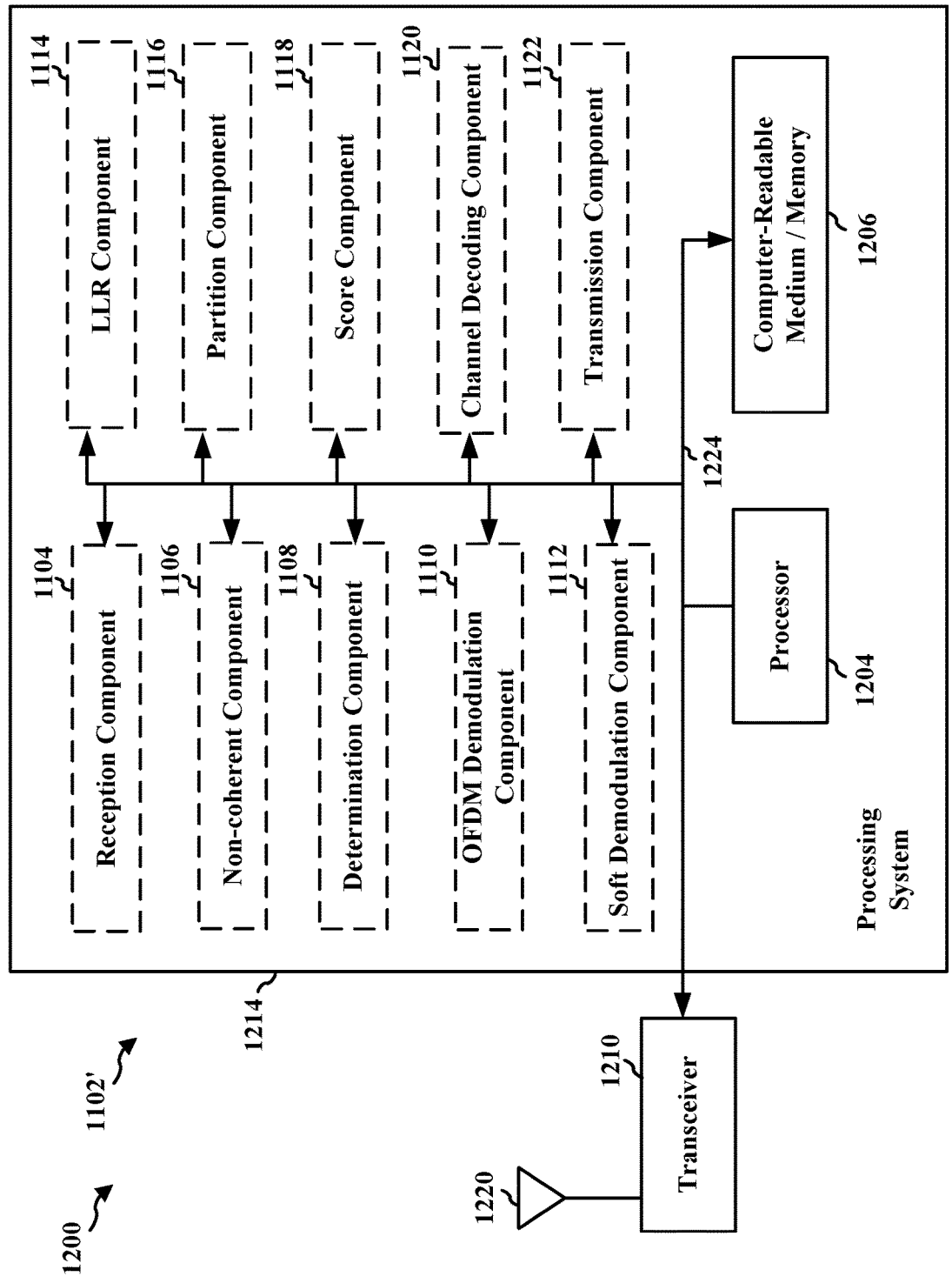
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, 1122, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1122, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120, 1122. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3). The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 310, 350 for wireless communication includes means for adding parity check bits to a set of information bits. The apparatus may also include means for generating a non-coherent transmission signal. The apparatus may also include means for transmitting the non-coherent transmission signal to a receiving device. The apparatus may have means for receiving, from a transmitting device, a non-coherent signal having at least one segment. The apparatus may include means for receiving a sequence of complex symbols corresponding to information bits and parity check bits, and means for jointly detecting the sequences. The aforementioned means may be one or more of the aforementioned components of the apparatus 310/350 configured to perform the functions recited by the aforementioned means.

Figure 13:
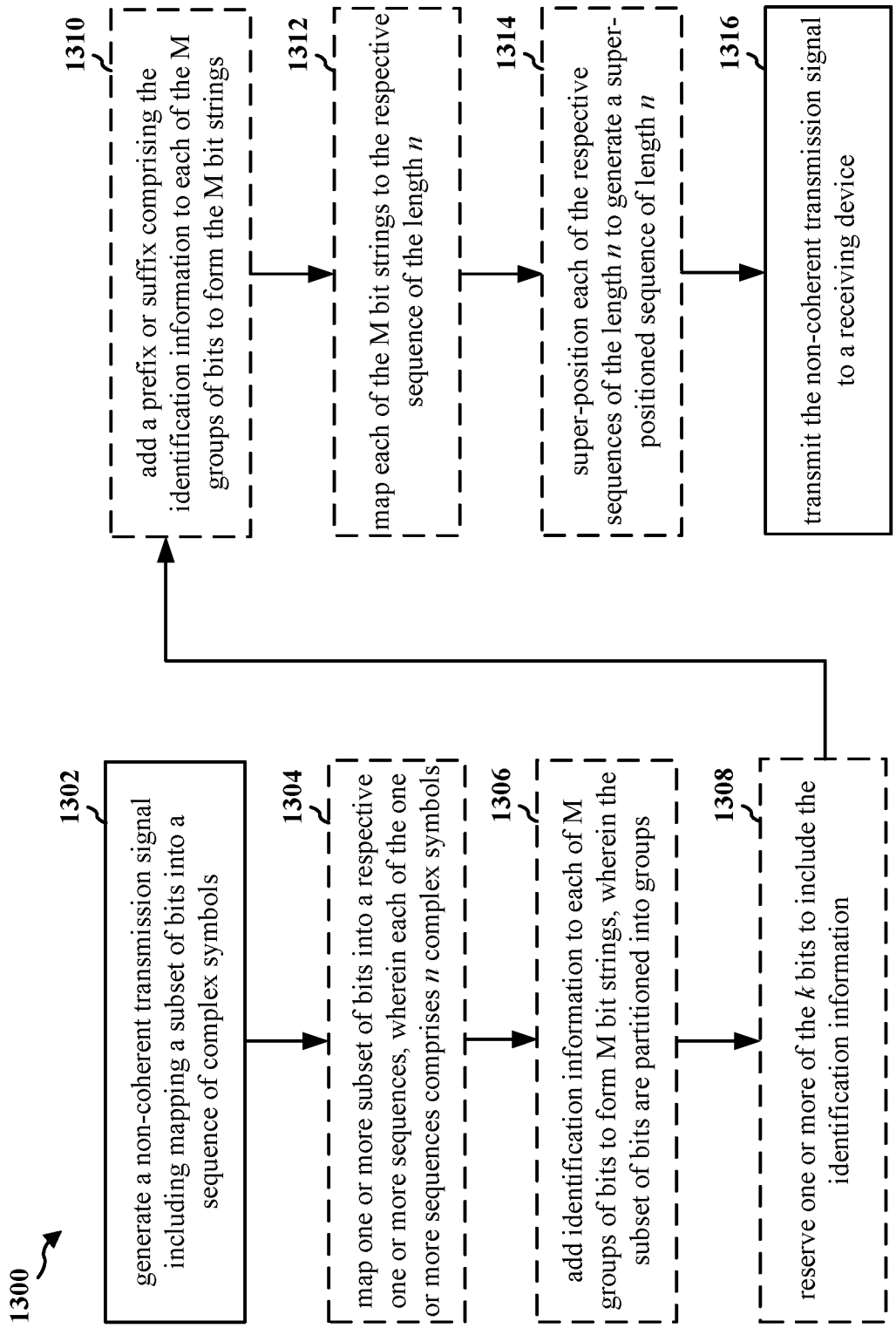
FIG. 13 is a flowchart of a method of wireless communication.

FIG. 13 is a flowchart of a method 1300 of wireless communication. The method may be performed by a transmitting device (e.g., the transmitting device 904; the apparatus 1402/1402'; the processing system 1514). The method may be performed by a receiving device (e.g., the transmitting device 904; the apparatus 1402/1402'; the processing system 1514). In some aspects, the transmitting device may comprise a UE or a component of the UE, such that the method may be performed by the UE or the component of a UE (e.g., the UE 104, 350; the apparatus 1102/1102'; the processing system 1214, which may include the memory 360 and which may be the entire UE 350 or a component of the UE 350, such as the TX processor 368, the RX processor 356, and/or the controller/processor 359). In some aspects, the transmitting device may comprise a base station or a component of the base station, such that the method may be performed by the base station or a component of the base station (e.g., the base station 102, 180, 310; the apparatus 1402/1402'; the processing system 1214, which may include the memory 376 and which may be the entire base station 310 or a component of the base station 310, such as the TX processor 316, the RX processor 370, and/or the controller/processor 375). According to various aspects, one or more of the illustrated operations of method 1300 may be omitted, transposed, and/or contemporaneously performed. Optional aspects are illustrated with a dashed line. The method may allow a transmitting device (e.g., base station or UE) to operate in a non-coherent communication scheme and transmit a transmission signal without transmitting any pilot signals or DMRS.

At block 1302, the transmitting device may generate a non-coherent transmission signal. For example, 1302 may be performed by generation component 1406 of apparatus 1402. The transmitting device may include, in the non-coherent transmission signal, mapping a subset of bits into a sequence of complex symbols. In some aspects, the subset of bits may comprise a subset of coded bits. The coded bits may be generated from a LDPC code or a Polar code.

In some aspects, for example, at block 1304, to generate the non-coherent transmission signal, the transmitting device may map one or more subset of bits into a respective one or more sequences of complex signals. For example, 1304 may be performed by map component 1408 of apparatus 1402. In some aspects, each of the one or more sequences comprises n complex symbols. In some aspects, each group may be mapped into a respective sequence of a length n of a plurality of sequences. In some aspects, the one or more sequences may be concatenated to form the non-coherent transmission signal. In some aspects, the mapping of the subset of bits into the sequence of complex symbols may determine if two k bits group differ in fewer bits, such that the two k bit groups may be mapped into two sequences having a larger cross-correlation. While in other aspects, the mapping of the subset of bits into the sequence of complex symbols may determine if two k bits group differ in more bits, such that the two k bit groups may be mapped into two sequences having a smaller cross correlation.

In some aspects, to generate the non-coherent transmission signal, the transmitting device may partition the one or more subset of bits into M groups of bits to form M bit strings. The transmitting device may map each of the M bit strings to the respective sequence based on a respective sequence set of the length n. The transmitting device may super-position each of the respective sequences of the length n to generate a super-positioned sequence of length n.

In some aspects, for example, at block 1306, to generate the non-coherent transmission signal, the transmitting device may add identification information to each of M groups of bits to form M bit strings. For example, 1306 may be performed by identification component 1410 of apparatus 1402. In some aspects, the subset of bits may be partitioned into groups. The identification information may indicate an identity of each of the groups from the M groups involved in the super-position.

In some aspects, for example, at block 1308, to add the identification information, the transmitting device may reserve one or more k bits to include the identification information. For example, 1308 may be performed by reservation component 1412 of apparatus 1402.

In some aspects, for example, at block 1310, to add the identification information, the transmitting device may add a prefix or suffix comprising the identification information to each of the M groups of bits to form the M bit strings. For example, 1310 may be performed by add component 1414 of apparatus 1402.

In some aspects, for example at block 1312, to generate the non-coherent transmission signal, the transmitting device may map each of the M bit strings to the respective sequence of the length n. For example, 1312 may be performed by sequence component 1416 of apparatus 1402.

In some aspects, for example at block 1314, to generate the non-coherent transmission signal, the transmitting device may super-position each of the respective sequences of the length n to generate a super-positioned sequence of length n. For example, 1314 may be performed by superposition component 1418 of apparatus 1402.

At block 1316, the transmitting device may transmit the non-coherent transmission signal to a receiving device. For example, 1316 may be performed by non-coherent component 1420 of apparatus 1402.

Figure 14:
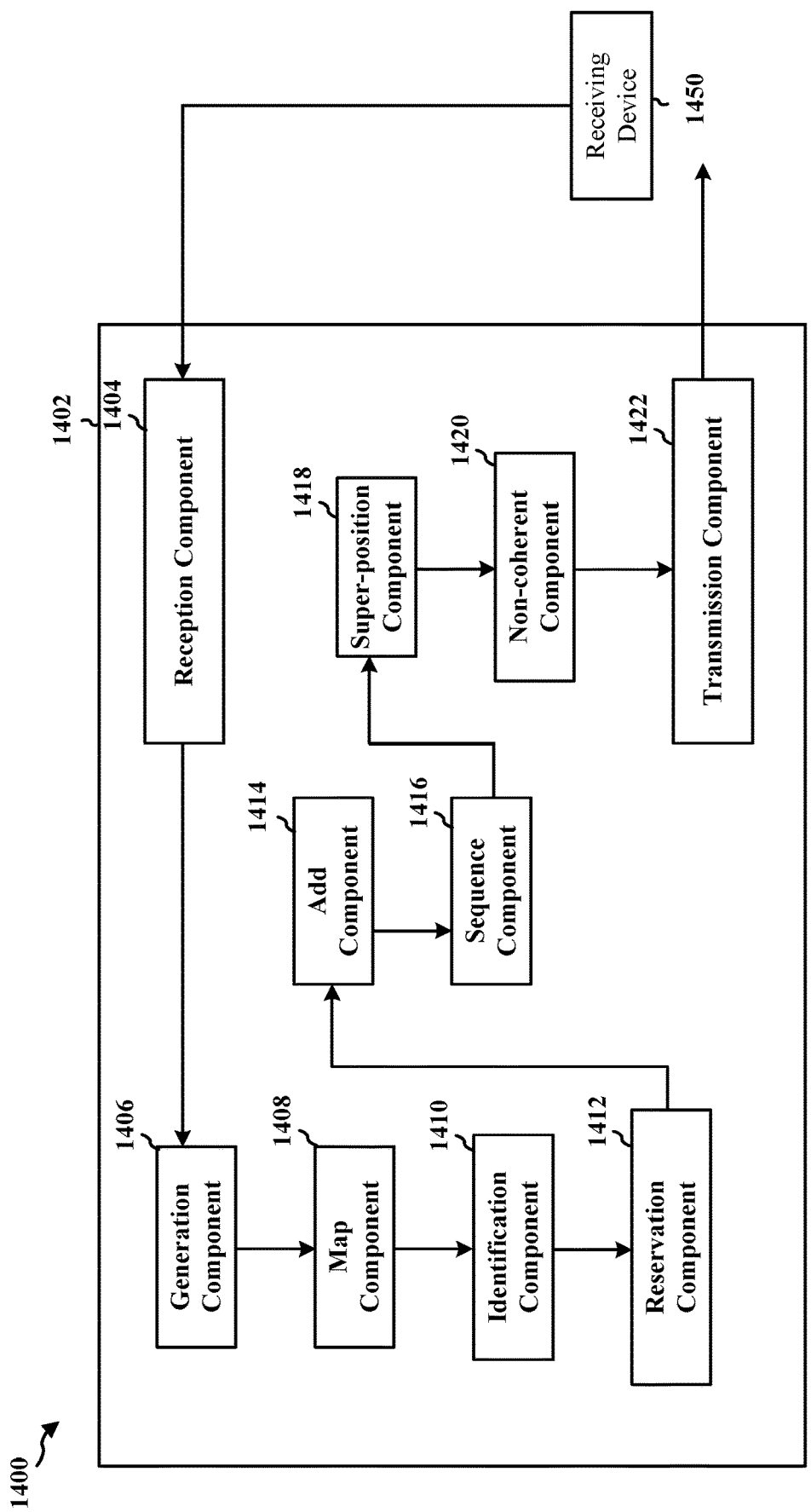
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a transmitting device. In some aspects, the apparatus may comprise a UE or a component of the UE. In some aspects, the apparatus may comprise a base station or a component of a base station. The apparatus includes a reception component 1404 that may be configured to receive various types of signals/messages and/or other information from other device, including, for example, the receiving device 1450. The apparatus includes a generation component 1406 that may generate a non-coherent transmission signal, e.g., as described in connection with 1302 of FIG. 13. The apparatus includes a map component 1408 that may map one or more subset of bits into a respective one or more sequences, e.g., as described in connection with 1304 of FIG. 13. The apparatus includes an identification component 1410 that may add identification information to each of M groups of bits to form M bit strings, e.g., as described in connection with 1306 of FIG. 13. The apparatus includes a reservation component 1412 that may reserve one or more of the k bits to include the identification information, e.g., as described in connection with 1308 of FIG. 13. The apparatus includes an add component 1414 that may add a prefix or suffix comprising the identification information to each of the M groups of bits to form the M bit strings, e.g., as described in connection with 1310 of FIG. 13. The apparatus includes a sequence component 1416 that may map each of the M bit strings to the respective sequence of the length n, e.g., as described in connection with 1312 of FIG. 13. The apparatus includes a super-position component 1418 that may super-position each of the respective sequences of the length n to generate a super-positioned sequence of length n, e.g., as described in connection with 1314 of FIG. 13. The apparatus includes a non-coherent component 1420 that may transmit the non-coherent transmission signal to a receiving device, e.g., as described in connection with 1316 of FIG. 13. The apparatus includes a transmission component 1422 that may be configured to transmit various types of signals/messages and/or other information to other devices, including, for example, the receiving device 1450.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
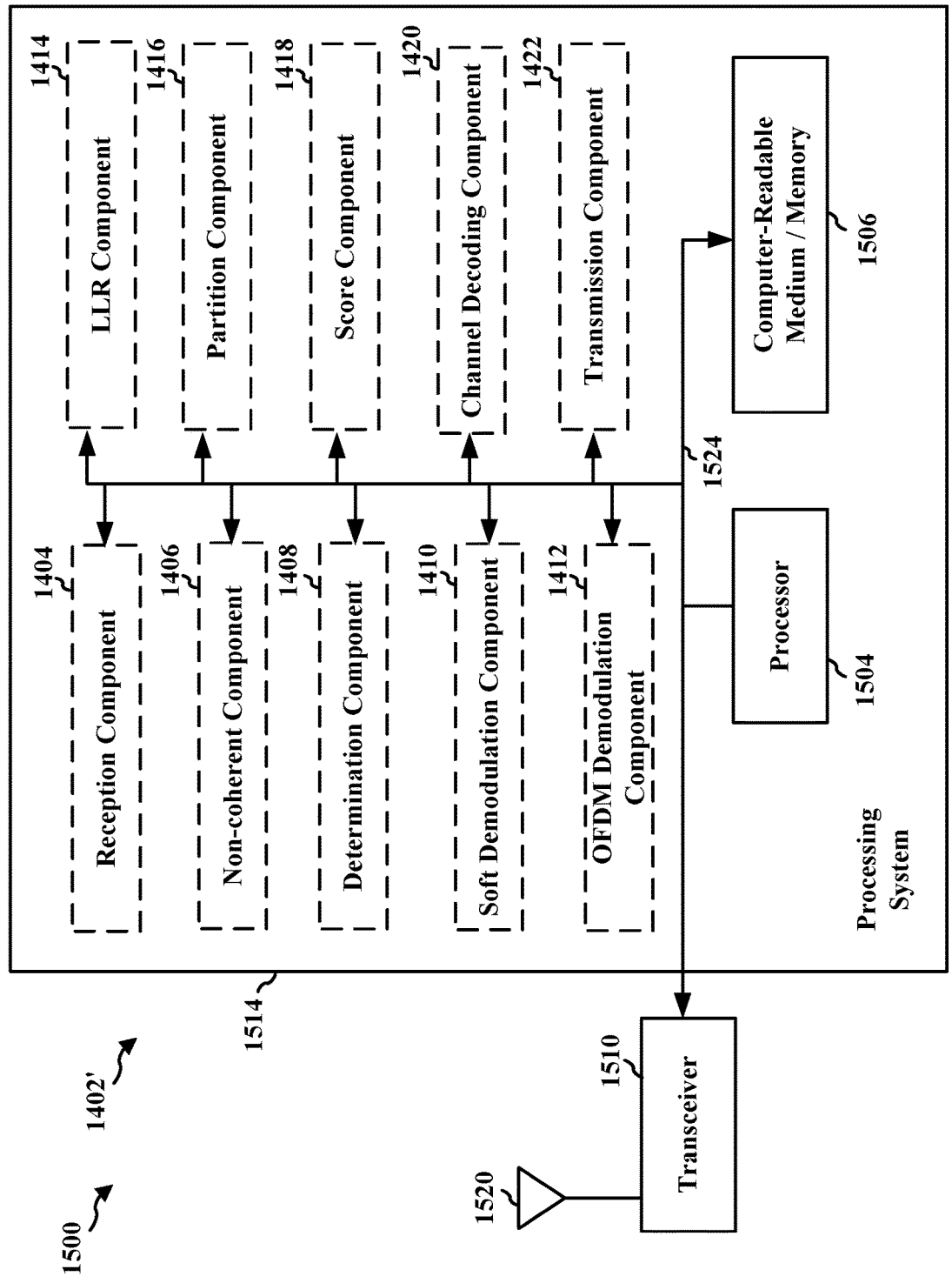
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, 1418, 1420, 1422, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1422, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, 1418, 1420, 1422. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3). The processing system 1514 may be a component of the UE 350 and may include the memory 360 and/or at least one of the TX processor 368, the RX processor 356, and the controller/processor 359. Alternatively, the processing system 1514 may be the entire UE (e.g., see 350 of FIG. 3).

When a group of information bits is segmented and mapped to separate sequences, the reliability of the overall payload may depend on the reliability of each segment. Thus, if any segment is not decoded successfully, the receiver may not be able to decode the whole payload, thereby resulting in a higher probability of a communication error. A channel coding (such as LDPC/polar or Reed-Muller code) component, as explained with respect to FIG. 6, may reduce the probability of a communication error by jointly protecting the segments of information payload. However, to fully realize the channel coding gain using conventional channel coding schemes, the receiver may be too complicated to implement.

According to aspects of the present disclosure, parity check bits are inserted, instead of performing the more complicated channel coding previously described. Together with a list decoder (explained later), the proposed scheme will have a better tradeoff between communication reliability and receiver complexity. Such improvements are now described with reference to FIGS. 16-20.

Figure 16:
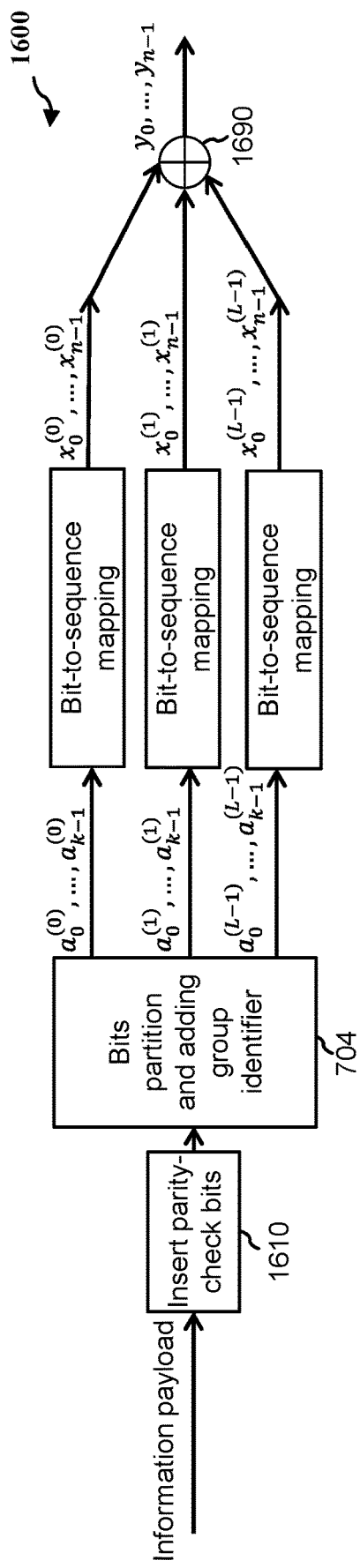
FIG. 16 is a diagram illustrating another example of a transmitter architecture for a non-coherent communication system, in accordance with certain aspects of the disclosure.

FIG. 16 is a diagram illustrating another example of a transmitter architecture for a non-coherent communication system, in accordance with certain aspects of the disclosure. The transmitter 1600 shown in FIG. 16 is similar to the transmitter 700 shown in FIG. 7A. The transmitter 1600 of FIG. 16, however, inserts parity check bits to the groups of information bits at block 1610, prior to partitioning bits and adding the group identifier at block 704. By inserting parity check bits, performance of the transmitter 1600 does not decrease as a payload size increases. Although FIG. 16 shows superpositioning of the sequences at element 1690 where $y_i = \sum_{i \in (0, \ldots, L-1)} x_i^{(i)}$, l=0, ..., n−1, concatenation is also possible where $[y_0, \ldots, y_{nL-1}] = [x_0^{(0)}, \ldots, x_{n-1}^{(0)}, \ldots, x_0^{(1)}, \ldots, x_{n-1}^{(1)}, \ldots, x_0^{(L-1)}, \ldots, x_{n-1}^{(L-1)}]$, where L is the number of sequences.

Figure 17:
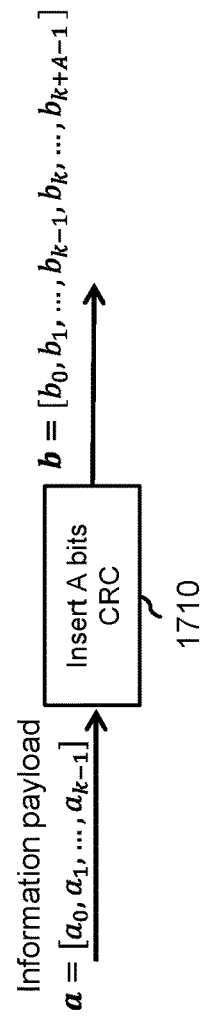
FIG. 17 is a diagram illustrating an example of inserting parity check bits for the transmitter architecture of FIG. 16, in accordance with certain aspects of the disclosure.

FIG. 17 is a diagram illustrating an example of inserting parity check bits for the transmitter architecture of FIG. 16, in accordance with certain aspects of the disclosure. In FIG. 17, block 1710 is one example of block 1610 from FIG. 16. In FIG. 17, a number of parity check bits, A, are inserted at block 1710. The bits inserted are CRC bits, in this example. A number, k, of information bits, a, are included in the information payload. That is, the set of information bits, a, includes information bits $a_0, \ldots, a_{k-1}$. After processing at block 1710, the output set, b, includes bits $$[b_0, \ldots b_{k-1}, b_k, \ldots, b_{k+A-1}],$$
$$\text{where } b_i = \begin{cases} a_i, & i = 0, \ldots, k-1 \\ f_j, & i = k, \ldots, k+A-1 \end{cases}.$$

In this case, the parameter $f_j$ denotes the $j^{th}$ CRC bit with j=k−k+1. For example, when 11<k<19 bits, seven to nine CRC bits may be used. In this example, the transmitter generates the CRC bits from primitive polynomials in the binary field $GF(2^4)$, in other words, the finite field of $2^4$ elements. For example, when A=9, either of the following two polynomials may be used: $g_{crc,9}(D) = D^9 + D^8 + D^6 + D^5 + 1$ or $g_{crc,9}(D) = D^9 + D^5 + 1$, where the polynomial function g(D) represents the CRC function. Encoding by CRC may be calculated by dividing the polynomial formed by the data payload by the CRC polynomial g(D).

As shown in FIG. 16, a transmitter 1600 may add parity check bits to a set of information bits (block 1610) prior to non-coherent transmission. FIG. 17 illustrates one option of inserting CRC bits as parity check bits. In another option, the transmitter 1600 inserts CRC bits along with additional parity check bits. In this option, the CRC bits may be generated as defined by the current new radio (NR) specification. Additional details of this option are provided later in this description.

Figure 18:
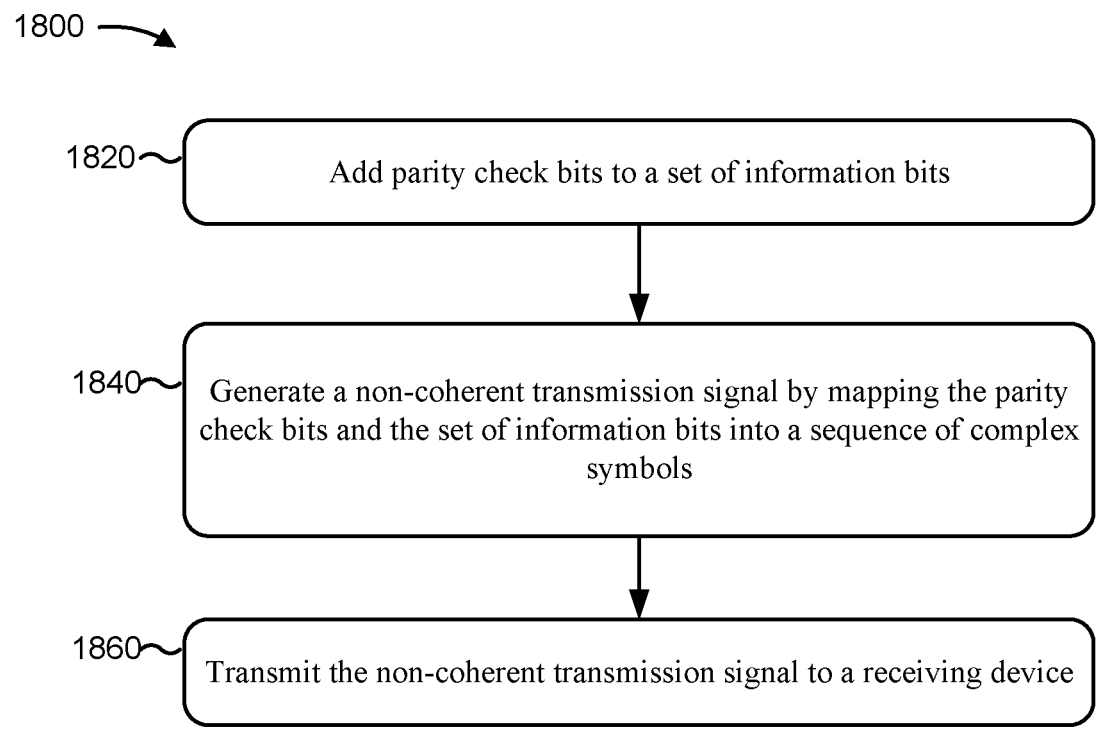
FIG. 18 is a flowchart of a method of wireless communication, for example, for a transmitting device, in accordance with various aspects of the present invention.

FIG. 18 is a flowchart of a method of wireless communication, for example, for a transmitting device, in accordance with various aspects of the present invention. FIG. 18 shows a method 1800 that may include adding parity check bits to a set of information bits (block 1820) prior to non-coherent transmission. The UE 350 or base station 310 (using, for example, the controller/processor 375, 359 and memory 376, 360) inserts parity check bits into the information payload, prior to partitioning the bits and sequence mapping.

In some aspects, the method 1800 may include generating a non-coherent transmission signal by mapping the parity check bits and the set of information bits into a sequence of complex symbols (block 1840). For example, the UE 350 or base station 310 (using, for example, the controller/processor 375, 359 and memory 376, 360) maps the bits to sequences. Optionally, the UE can either superposition the sequences into one length-n signal, or concatenate the L sequences into a length n*L signal. If concatenation occurs, a group identifier can be omitted.

In some aspects, the method 1800 may include transmitting the non-coherent transmission signal to a receiving device (block 1860). For example, the UE 350 or base station 310, (using the antenna 352, 320, modulator 354, 318, transmit processor 368, 316, controller/processor 359, 375, and memory 360, 376) transmits the signal.

The information bits may be an uplink control information (UCI) payload transmitted on a physical uplink control channel (PUCCH). In this case, the technique enhances cell coverage for cell edge UEs. In this PUCCH example, the transmitter is a UE and the receiver is a base station. Both the transmitter and the receiver determine the number of segments, and also determine the number of parity check bits based on the payload size. If the parity check bits are cyclic redundancy check (CRC) bits and if the payload is an uplink control information (UCI) payload of 11 bits or less, no parity check bits are added and segmentation does not occur. If the payload is between 12 and 19 bits, two segments are used, and seven to nine CRC bits are inserted. If the number of UCI bits is greater than or equal to 20, more than two segments are used, and 16 CRC bits are inserted.

If the parity check bits are CRC bits plus additional parity check bits, the additional parity check bits are based on a binary function of the information bits and/or the CRC bits. The parity check function should incorporate information bits/CRC bits from at least two different groups.

According to aspects of the present disclosure, the transmitter and the receiver both determine the number of segments, and also the number of parity check bits based on the UCI payload size. If the UCI payload is between 12 and 19 bits, two segments are created, and six CRC bits and one to three additional parity check bits are provided. The number of additional parity bits may depend on whether there is an even or odd number of bits in the UCI payload. If an odd number is present, one or three additional bits are inserted. Otherwise, two additional parity check bits are provided. Thus, in both cases, an even number of information plus party bits results, allowing equal division into two subsets/segments. If the number of UCI bits is 20 or more, 11 CRC bits and four additional bits are inserted. Similar to the two segment case (k=2) discussed above, if more than two segments exist (k>2), the number of additional parity check bits may be determined such that the total number of information plus parity check bits (including the CRC bits) is a multiple of the number of segments k, allowing equal division into k subsets/segments.

In addition to UCI transmitted over a PUCCH, for example in 5G NR or another radio access technology (RAT), the payload may be sidelink control information (SCI) or a feedback transmission, or a discovery signal transmitted over a sidelink, such as an NR sidelink, for example. The payload may also be a random access channel (RACH) signal in 5G NR or another RAT. In still another example, the payload may be downlink control information (DCI) or a wake up signal.

Figure 19A:
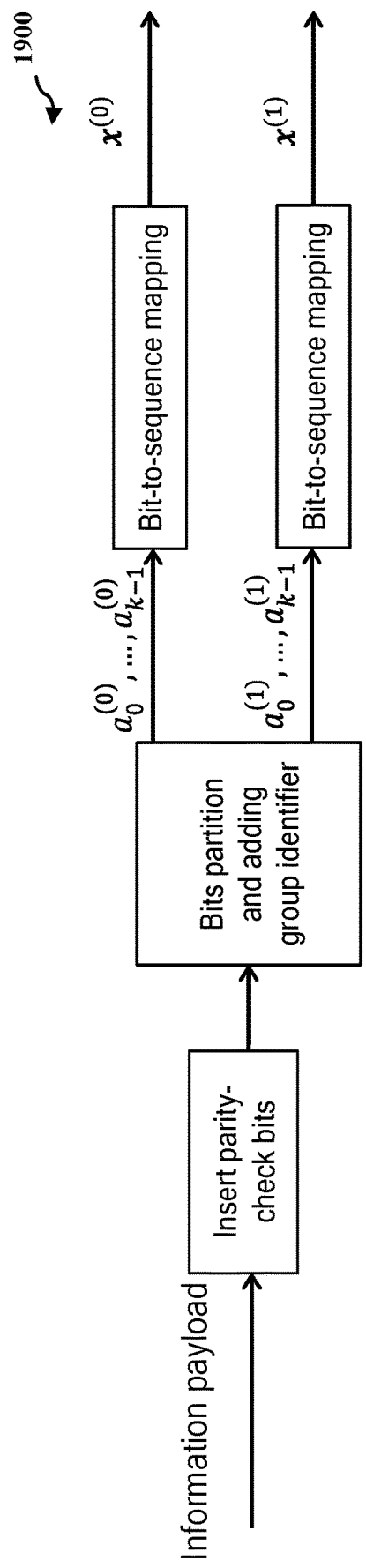
FIG. 19A is a diagram illustrating an example of a transmitter architecture for a non-coherent communication system, in accordance with certain aspects of the disclosure.
Figure 19B:
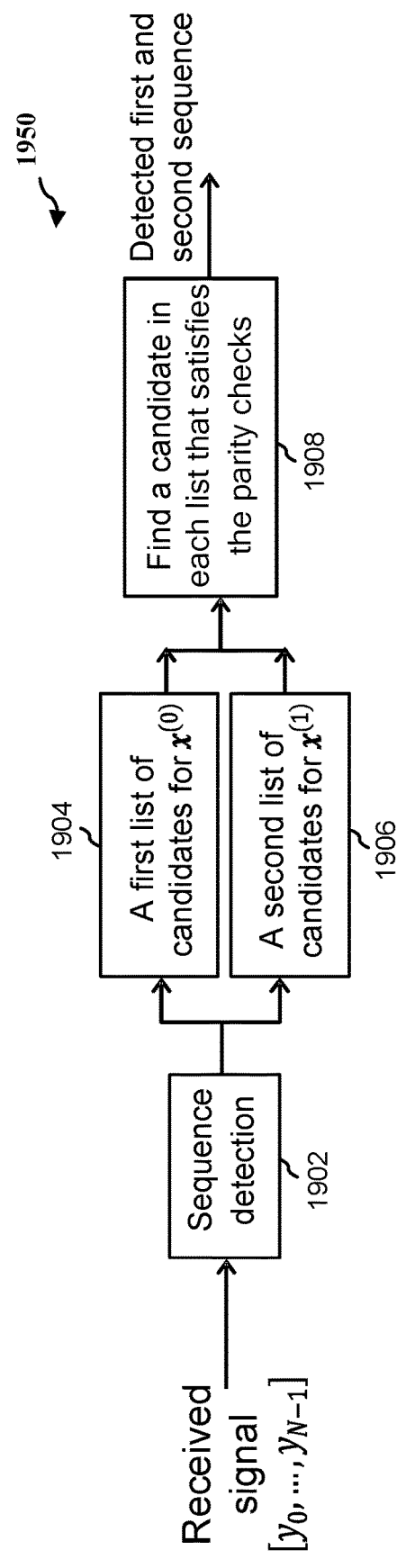
FIG. 19B is a diagram illustrating an example of a receiver architecture for a non-coherent communication system, in accordance with certain aspects of the disclosure.

FIG. 19A is a diagram illustrating an example of a transmitter architecture for a non-coherent communication system, in accordance with certain aspects of the disclosure. FIG. 19B is a diagram illustrating an example of a receiver architecture for a non-coherent communication system, in accordance with certain aspects of the disclosure. The transmitter 1900 of FIG. 19A is similar to the transmitter 1600 of FIG. 16. In the example FIG. 19A, the transmitter 1900 outputs two sequences $x^{(0)}$ and $x^{(1)}$ that are either superpositioned (not shown) into one length n signal or concatenated (not shown) into a length n×L signal, $y_0, \ldots, y_{N-1}$ for transmission to a receiver 1950, where L represents the number of sequences. The receiver 1950 includes a sequence detection block 1902 to process a received signal to generate a first list of candidates for the first sequence $x^{(0)}$ 1904 and a second list of candidates for the second sequence $x^{(1)}$ 1906. The receiver 1950 finds a candidate in each list that satisfies the parity checks, at block 1908, and outputs the jointly detected first and second sequences $x^{(0)}$ and $x^{(1)}$. Although two lists and sequences (e.g., segments) are described, the present disclosure is not limited to two.

Figure 20:
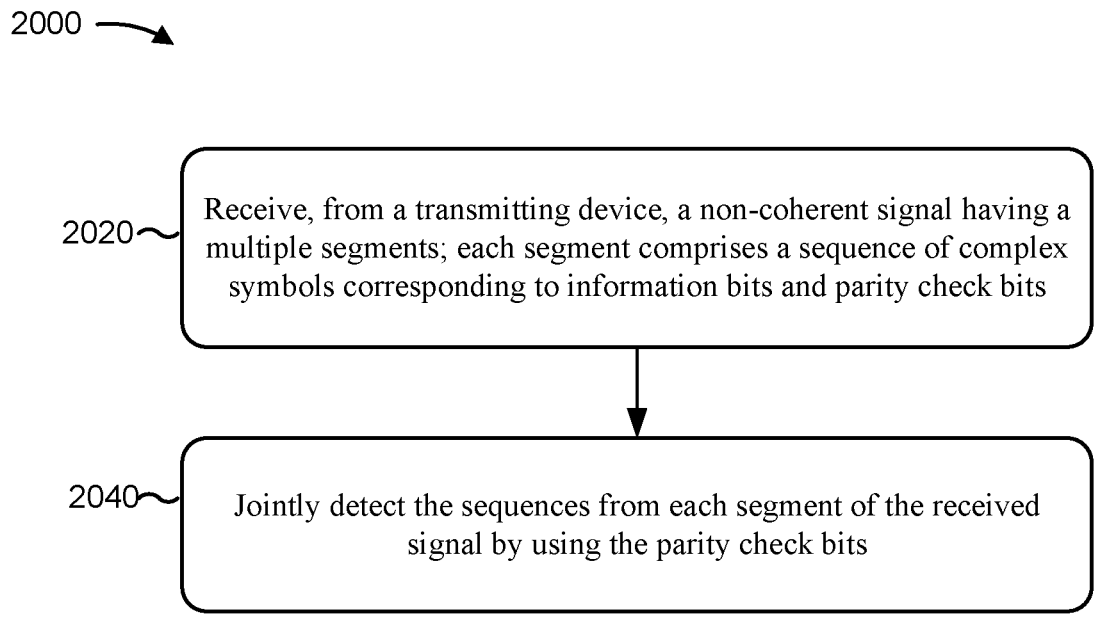
FIG. 20 is a flowchart of a method of wireless communication, for example, for a receiving device, in accordance with various aspects of the present invention.

FIG. 20 is a flowchart of a method of wireless communication, for example, for a receiving device, in accordance with various aspects of the present invention. As shown in FIG. 20, in some aspects, a method 2000 may perform non-coherent reception. The method 2000 may include receiving, from a transmitting device, a non-coherent signal having multiple segments. Each segment comprises a sequence of complex symbols corresponding to information bits and parity check bits (block 2020). For example, the receiver device 310, 350 may receive (via the antenna 320, 352, demodulator 318, 354, receive processor 370, 356, controller/processor 375, 359, and memory 376, 360) the non-coherent signal. The non-coherent signal includes multiple segments. For example, if the transmitter divided the information plus parity bits into two segments, then two sequences form the non-coherent signal.

The goal of the receiver is to determine the two sequences. Thus, once the signal is received, in some aspects, the receiver may jointly detect the sequences from each segment of the received signal by using the parity check bits (block 2040). For example, the receiving device 310, 350 may process the data with the controller/processor 375, 359, and memory 376, 360.

Rather than detecting the two candidate sequences separately from the received signal, the receiver may produce two lists of candidates for the two sequences, respectively (e.g., a first list and a second list for the first sequence and the second sequence as shown in FIG. 19B). The receiver may find a first detected sequence in the first list and a second detected sequence in the second list, such that they satisfy the parity checks (e.g., the information plus parity bits that correspond to the two sequences satisfy the parity check conditions). Namely, each candidate in the first list and the second list may correspond to a set of bits. The receiver may take a first arbitrary candidate from the first set and a second arbitrary candidate from the second set, determine their corresponding bits, and examine if the two sets of bits jointly satisfy the parity checks. If so, then this pair of sequences is assumed to be the pair transmitted by the transmitter. If not, then the receiver may move to another pair of sequences (e.g., one from each list) until the receiver finds a pair of sequences with corresponding bits that satisfy the parity checks. In other words, the receiver uses the parity check bits to determine the final candidate from each list.

According to aspects of the present disclosure, a product of the size of the first list and the second list should be smaller than a threshold. For example, the threshold may be determined based on the total parity check length (A) and a predetermined false alarm rate, $P_{FA}$. In one example, $T_0 \times T_1 \ldots \times T_{L-1} \leq P_{FA} \times 2^A$, where Tj denotes the list size Tj for the $j^{th}$ list, $P_{FA}$ represents the determined false alarm rate, and A is the total parity check length.

The present disclosure relates to a non-coherent communication system, where a receiving device may be configured to determine or decode information received from a transmitting device without performing any channel estimation. Furthermore, the transmitting device may be configured to not transmit any pilot/DMRS, which may provide additional resources to transmit the information to the receiving device. At least one advantage of the disclosure is that the non-coherent scheme may be utilized in the uplink for coverage enhancement (e.g., PUCCH and/or PUSCH channels). At least another advantage of the disclosure is that the non-coherent scheme may be used for preamble-less random access in a 2-step RACH procedure. For example, instead of transmitting preamble and data (e.g., message A), the transmitting device may directly transmit the data using the non-coherent communication without transmitting a DMRS and the preamble. Another advantage is that the non-coherent scheme may be used on PDCCH targeting for complexity reduction, which may reduce the complexity of blind decoding. In addition, the non-coherent scheme may be used on a discovery channel in sidelink communication (e.g., UE to UE communication).

Implementation examples are described in the following numbered clauses:

1. A method of wireless communication at a transmitting device, comprising:
adding parity check bits to a set of information bits;
generating a non-coherent transmission signal by mapping the parity check bits and the set of information bits into a sequence of complex symbols; and
transmitting the non-coherent transmission signal to a receiving device.

2. The method of clause 1, in which the parity check bits comprise cyclic redundancy check (CRC) bits.

3. The method of clause 1 or 2, in which the parity check bits further comprise additional parity check bits based on the set of information bits and/or the CRC bits.

4. The method of any of the preceding clauses, in which generating the non-coherent transmission signal comprises:
segmenting the set of information bits and the parity check bits into a plurality of segments comprising subsets of information plus parity bits; and
mapping each subset to a respective sequence of a plurality of sequences for the non-coherent transmission signal, each sequence comprising n complex symbols.

5. The method of clause 4, in which the parity check bits comprise cyclic redundancy check (CRC) bits and additional parity check bits that are based on at least two different subsets of the set of information plus parity bits and/or at least two different subsets of the CRC bits.

6. The method of clause 4 or 5, in which the plurality of sequences are concatenated to form the sequence of complex symbols for the non-coherent transmission signal.

7. The method of clause 4 or 5, in which the plurality of sequences are super-positioned to form the sequence of complex symbols for the non-coherent transmission signal.

8. The method of clause 4, 5, 6, or 7, further comprising determining a quantity of the plurality of segments based on a quantity of bits for a payload, in response to the set of information bits comprising the payload.

9. The method of clause 4, 5, 6, 7, or 8, in which the information bits comprise an uplink control information (UCI) payload transmitted on a physical uplink control channel (PUCCH).

10. The method of any of the preceding clauses, in which the parity check bits comprise a first quantity of cyclic redundancy check (CRC) bits when a payload corresponding to the set of information bits is smaller than a threshold and the parity check bits comprise a second quantity of bits when the payload corresponding to the set of information bits is greater than the threshold.

11. The method of any of the preceding clauses, in which the parity check bits comprise a first quantity of cyclic redundancy check (CRC) bits and a second quantity of additional parity check bits when a payload corresponding to the set of information bits is smaller than a threshold, and the parity check bits comprise a third quantity of CRC bits a fourth quantity of additional parity check bits when the payload corresponding to the set of information bits is greater than the threshold.

12. The method of any of the preceding clauses, further comprising determining a quantity of parity check bits based on a quantity of segments into which the set of information bits are partitioned.

13. A method of wireless communication at a receiving device, comprising:
  receiving, from a transmitting device, a non-coherent signal having at least one segment, each segment comprising a sequence of complex symbols corresponding to information bits and parity check bits; and
  jointly detecting the sequence from each segment of the received non-coherent signal by using the parity check bits.

14. The method of clause 13, in which the jointly detecting comprises:
  generating a list of candidates for each sequence; and
  finding the sequence in each list of candidates based on the parity check bits.

15. The method of clause 14, in which finding the sequence further comprises finding the sequence such that corresponding information bits and parity check bits of the sequence in each list of candidates satisfy parity check conditions represented by the parity check bits.

16. The method of clause 15, in which a product of a size of each list is smaller than a threshold that is based on a predetermined false alarm rate and a quantity of parity check bits.

17. The method of clause 13, 14, 15, or 16, further comprising determining a quantity of parity check bits based on a quantity of bits for a payload in response to the information bits comprising the payload.

18. The method of any of clauses 13-17, further comprising determining a quantity of the at least one segment based on a quantity of bits for a payload in response to the information bits comprising the payload.

19. The method of any of clauses 13-18, further comprising determining the information bits based on jointly detecting the sequences.

20. A transmitting device for wireless communication comprising:
  a memory, and
  one or more processors operatively coupled to the memory, the memory and the one or more processors configured:
    to add parity check bits to a set of information bits;
    to generate a non-coherent transmission signal by mapping the parity check bits and the set of information bits into a sequence of complex symbols; and
    to transmit the non-coherent transmission signal to a receiving device.

21. The transmitting device of clause 20, in which the parity check bits comprise cyclic redundancy check (CRC) bits.

22. The transmitting device of clause 21, in which the parity check bits further comprise additional parity check bits based on the set of information bits and/or the CRC bits.

23. The transmitting device of any of clauses 20-22, in which the one or more processors are further configured:
  to segment the set of information bits and the parity check bits into a plurality of segments comprising subsets of information plus parity bits; and
  to map each subset to a respective sequence of a plurality of sequences for the non-coherent transmission signal, each sequence comprising n complex symbols.

24. The transmitting device of clause 23, in which the parity check bits comprise cyclic redundancy check (CRC) bits and additional parity check bits that are based on at least two different subsets of the set of information plus parity bits and/or at least two different subsets of the CRC bits.

25. The transmitting device of clause 23 or 24, in which the plurality of sequences are concatenated to form the sequence of complex symbols to form the non-coherent transmission signal.

26. The transmitting device of clause 23 or 24, in which the plurality of sequences are super-positioned to form the sequence of complex symbols to form the non-coherent transmission signal.

27. The transmitting device of any of clauses 20-26, in which the parity check bits comprise a first quantity of cyclic redundancy check (CRC) bits when a payload corresponding to the set of information bits is smaller than a threshold and the parity check bits comprise a second quantity of bits when the payload corresponding to the set of information bits is greater than the threshold.

28. The transmitting device of any of clauses 20-27, in which the parity check bits comprise a first quantity of cyclic redundancy check (CRC) bits and a second quantity of additional parity check bits when a payload corresponding to the set of information bits is smaller than a threshold, and the parity check bits comprise a third quantity of CRC bits a fourth quantity of additional parity check bits when the payload corresponding to the set of information bits is greater than the threshold.

29. The transmitting device of any of clauses 20-28, in which the one or more processors are further configured to determine a quantity of parity check bits based on a quantity of segments into which the set of information bits are partitioned.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

The previous description is provided to enable any person skilled in the art to practice the various aspects described. Various modifications to these aspects will be readily apparent to those skilled in the art, and the generic principles defined may be applied to other aspects. Thus, the claims are not intended to be limited to the aspects shown, but is to be accorded the full scope consistent with the language claims, wherein reference to an element in the singular is not intended to mean "one and only one" unless specifically so stated, but rather "one or more." The word "exemplary" is used to mean "serving as an example, instance, or illustration." Any aspect described as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated by reference and are intended to be encompassed by the claims. Moreover, nothing disclosed is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a transmitting device, comprising:
    adding parity check bits to a set of information bits;
    segmenting the set of information bits and the parity check bits into a plurality of segments comprising subsets of information plus parity bits, the segmenting occurring after the adding;
    generating a non-coherent transmission signal by mapping the subsets of information plus parity bits into a plurality of sequences of complex symbols; and
    transmitting the non-coherent transmission signal to a receiving device.

2. The method of claim 1, in which the parity check bits comprise cyclic redundancy check (CRC) bits.

3. The method of claim 2, in which the parity check bits further comprise additional parity check bits based on the set of information bits and/or the CRC bits.

4. The method of claim 1, in which generating the non-coherent transmission signal comprises:
    mapping each subset to a respective sequence of the plurality of sequences for the non-coherent transmission signal, each sequence comprising n complex symbols.

5. The method of claim 4, in which the parity check bits comprise cyclic redundancy check (CRC) bits and additional parity check bits that are based on at least two different subsets of the set of information plus parity bits and/or at least two different subsets of the CRC bits.

6. The method of claim 4, in which the plurality of sequences are concatenated to form the sequence of complex symbols for the non-coherent transmission signal.

7. The method of claim 4, in which the plurality of sequences are super-positioned to form the sequence of complex symbols for the non-coherent transmission signal.

8. The method of claim 4, further comprising determining a quantity of the plurality of segments based on a quantity of bits for a payload, in response to the set of information bits comprising the payload.

9. The method of claim 1, in which the information bits comprise an uplink control information (UCI) payload transmitted on a physical uplink control channel (PUCCH).

10. The method of claim 1, in which the parity check bits comprise a first quantity of cyclic redundancy check (CRC) bits when a payload corresponding to the set of information bits is smaller than a threshold and the parity check bits comprise a second quantity of bits when the payload corresponding to the set of information bits is greater than the threshold.

11. The method of claim 1, in which the parity check bits comprise a first quantity of cyclic redundancy check (CRC) bits and a second quantity of additional parity check bits when a payload corresponding to the set of information bits is smaller than a threshold, and the parity check bits comprise a third quantity of CRC bits and a fourth quantity of additional parity check bits when the payload corresponding to the set of information bits is greater than the threshold.

12. The method of claim 1, further comprising determining a quantity of parity check bits based on a quantity of segments into which the set of information bits are partitioned.

13. A method of wireless communication at a receiving device, comprising:
    receiving; from a transmitting device; a non-coherent signal having a plurality of segments, each segment comprising a sequence of complex symbols corresponding to a subset of information bits and a subset of parity check bits; and
    jointly detecting the sequence from each segment of the received non-coherent signal by using the parity check bits.

14. The method of claim 13, in which the jointly detecting comprises:
    generating a list of candidates for each sequence; and
    finding the sequence in each list of candidates based on the parity check bits.

15. The method of claim 14, in which finding the sequence further comprises finding the sequence such that corresponding information bits and parity check bits of the sequence in each list of candidates satisfy parity check conditions represented by the parity check bits.

16. The method of claim 15, in which a product of a size of each list is smaller than a threshold that is based on a predetermined false alarm rate and a quantity of parity check bits.

17. The method of claim 13, further comprising determining a quantity of parity check bits based on a quantity of bits for a payload in response to the information bits comprising the payload.

18. The method of claim 13, further comprising determining a quantity of the plurality of segments based on a quantity of bits for a payload in response to the information bits comprising the payload.

19. The method of claim 13, further comprising determining the information bits based on jointly detecting the sequence from each segment.

20. A transmitting device for wireless communication comprising:
    a memory, and
    one or more processors operatively coupled to the memory, the memory and the one or more processors configured:
    to add parity check bits to a set of information bits;
    to segment the set of information bits and the parity check bits into a plurality of segments comprising subsets of information plus parity bits, the segmenting occurring after the adding;
to generate a non-coherent transmission signal by mapping the subsets of information plus parity bits into a plurality of sequences of complex symbols; and
to transmit the non-coherent transmission signal to a receiving device.

21. The transmitting device of claim 20, in which the parity check bits comprise cyclic redundancy check (CRC) bits.

22. The transmitting device of claim 21, in which the parity check bits further comprise additional parity check bits based on the set of information bits and/or the CRC bits.

23. The transmitting device of claim 20, in which the one or more processors are further configured:
to map each subset to a respective sequence of the plurality of sequences for the non-coherent transmission signal, each sequence comprising n complex symbols.

24. The transmitting device of claim 23, in which the parity check bits comprise cyclic redundancy check (CRC) bits and additional parity check bits that are based on at least two different subsets of the set of information plus parity bits and/or at least two different subsets of the CRC bits.

25. The transmitting device of claim 23, in which the plurality of sequences are concatenated to form the sequence of complex symbols to form the non-coherent transmission signal.

26. The transmitting device of claim 23, in which the plurality of sequences are super-positioned to form the sequence of complex symbols to form the non-coherent transmission signal.

27. The transmitting device of claim 20, in which the parity check bits comprise a first quantity of cyclic redundancy check (CRC) bits when a payload corresponding to the set of information bits is smaller than a threshold and the parity check bits comprise a second quantity of bits when the payload corresponding to the set of information bits is greater than the threshold.

28. The transmitting device of claim 20, in which the parity check bits comprise a first quantity of cyclic redundancy check (CRC) bits and a second quantity of additional parity check bits when a payload corresponding to the set of information bits is smaller than a threshold, and the parity check bits comprise a third quantity of CRC bits and a fourth quantity of additional parity check bits when the payload corresponding to the set of information bits is greater than the threshold.

29. The transmitting device of claim 20, in which the one or more processors are further configured to determine a quantity of parity check bits based on a quantity of segments into which the set of information bits are partitioned.

30. A receiving device for wireless communication comprising:
a memory, and
one or more processors operatively coupled to the memory, the memory and the one or more processors configured:
to receive, from a transmitting device, a non-coherent signal having a plurality of segments, each segment comprising a sequence of complex symbols corresponding to a subset of information bits and a subset of parity check bits; and
to jointly detect the sequences from each segment of the received non-coherent signal by using the parity check bits.

* * * * *